(12) United States Patent
Mekkat et al.

(10) Patent No.: US 10,228,956 B2
(45) Date of Patent: Mar. 12, 2019

(54) SUPPORTING BINARY TRANSLATION ALIAS DETECTION IN AN OUT-OF-ORDER PROCESSOR

(71) Applicant: Intel Corporation, Santa Clara, CA (US)

(72) Inventors: Vineeth Mekkat, San Jose, CA (US); Mark J. Dechene, Hillsboro, OR (US); Zhongying Zhang, Portland, OR (US); Jason Agron, San Jose, CA (US); Sebastian Winkel, Los Altos, CA (US)

(73) Assignee: Intel Corporation, Santa Clara, CA (US)

( * ) Notice: Subject to any disclaimer, the term of this patent is extended or adjusted under 35 U.S.C. 154(b) by 101 days.

(21) Appl. No.: 15/282,266

(22) Filed: Sep. 30, 2016

(65) Prior Publication Data

US 2018/0095765 A1   Apr. 5, 2018

(51) Int. Cl.
*G06F 9/312* (2018.01)
*G06F 9/44* (2018.01)
*G06F 9/455* (2018.01)
*G06F 9/38* (2018.01)
*G06F 8/41* (2018.01)
(Continued)

(52) U.S. Cl.
CPC .............. *G06F 9/455* (2013.01); *G06F 8/445* (2013.01); *G06F 8/52* (2013.01); *G06F 9/3834* (2013.01); *G06F 8/443* (2013.01); *G06F 8/4432* (2013.01); *G06F 8/4434* (2013.01); *G06F 8/4435* (2013.01); *G06F 9/3017* (2013.01); *G06F 9/30043* (2013.01); *G06F 9/30145* (2013.01); *G06F 9/30181* (2013.01); *G06F 9/30185* (2013.01)

(58) Field of Classification Search
CPC .. G06F 9/3838; G06F 9/30043; G06F 9/3855; G06F 9/30145; G06F 9/30185; G06F 9/3857; G06F 9/3826; G06F 8/443; G06F 8/4432; G06F 8/4434; G06F 8/4435; G06F 9/455; G06F 9/3834; G06F 9/3017; G06F 9/30181; G06F 8/445; G06F 8/52
USPC ........................... 712/216–219; 717/151–161
See application file for complete search history.

(56) References Cited

U.S. PATENT DOCUMENTS

| 5,434,987 | A | * | 7/1995 | Abramson | ............ | G06F 9/3812 |
|||||||712/226|
| 6,658,559 | B1 | * | 12/2003 | Arora | ...................... | G06F 9/383 |
|||||||712/225|

(Continued)

*Primary Examiner* — Daniel H Pan
(74) *Attorney, Agent, or Firm* — Lowenstein Sandler LLP

(57) ABSTRACT

In one implementation, a processing device is provided that includes a memory to store instructions and a processor core to execute the instructions. The processor core is to receive a sequence of instructions reordered by a binary translator for execution. A first load of the sequence of instructions is identified. The first load references a memory location that stores a data item to be loaded. An occurrence of a second load is detected. The second load to access the memory location subsequent to an execution of the first load instruction. A protection field in the first load is enabled based on the detected occurrence of the second load. The enabled protection field indicates that the first load is to be checked for an aliasing associated with the memory location with respect to a subsequent store instruction. The second load is eliminated based on the enabled of the protection field.

20 Claims, 13 Drawing Sheets

(51) Int. Cl.
   *G06F 8/52*   (2018.01)
   *G06F 9/30*   (2018.01)

(56) References Cited

U.S. PATENT DOCUMENTS 6,681,317 B1 * 1/2004 Mathews ................ G06F 9/383
                                                    712/203
2004/0059898 A1 * 3/2004 Baxter .................. G06F 9/3017
                                                    712/235

* cited by examiner

SUPPORTING BINARY TRANSLATION ALIAS DETECTION IN AN OUT-OF-ORDER PROCESSOR

TECHNICAL FIELD

Embodiments of the disclosure relate generally to microprocessors and more specifically, but without limitation, for supporting binary translation alias detection in an out-of-order processor.

BACKGROUND

Multi-core processors are found in most computing systems today, including servers, desktops and a System on a Chip (SoC). Computer systems that utilize these multi-core processors may execute instructions of various types of code. Often, the code is not designed for a particular processor, and, therefore, the codes performance on a given platform may not be optimal. In such cases, certain multi-core processors may include a binary translator that generates code for a different platform. In doing so, the binary translator may optionally optimize the code by re-ordering certain operations.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
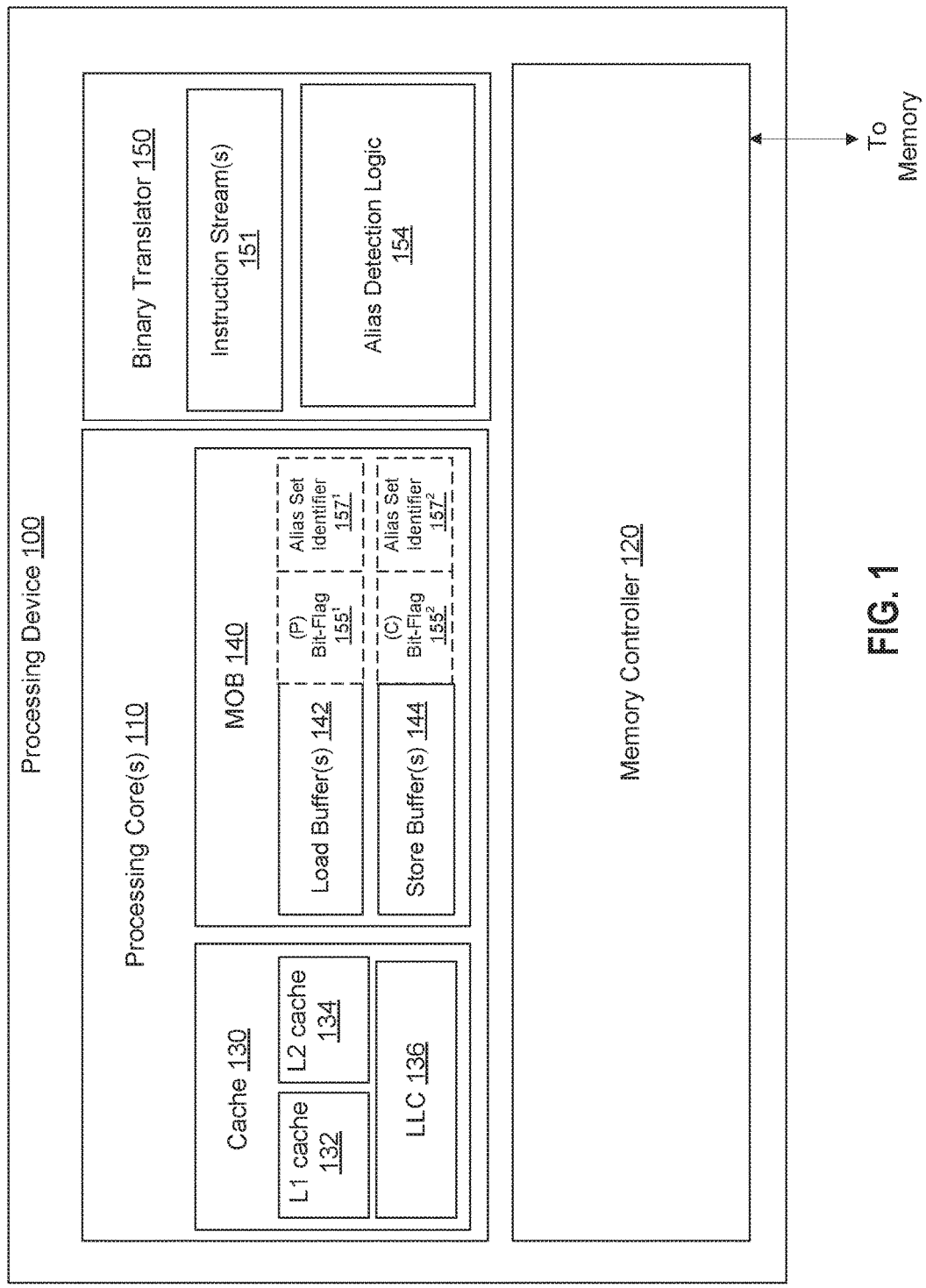
FIG. 1 illustrates a block diagram of a processing device to support binary translation alias detection according to one embodiment.

Implementations for supporting binary translation alias detection in an Out-of-Order (OoO) processor are disclosed herein. A binary translator can take original code instructions and optionally optimize the code by re-ordering some operations. In some computer systems, effective optimization techniques can improve performance and reduce power consumption. During runtime, the binary translator can reorder the placement of instructions for the generated code. In some systems, memory operations associated with the generated code can be executed in a different order than the order in which the instructions were fetched and decoded. For example, the binary translator can speculatively reorder the execution of certain memory operations according to particular optimization procedures. In such systems, these techniques for speculatively reordering memory operations are shown to be effective mechanisms for improving the performance of OoO microprocessors.

When the binary translator reorders the memory operations, the operations need to be checked at run time to ensure that data dependency relationships have not been violated. For example, a memory load and store operation to the same memory address may have to be executed in the same sequence in the reordered code as in the code prior to the reordering. Similarly, two store operations to the same memory address may have to be executed in the same sequence in the reordered code as in the code prior to the reordering. In some situations, memory disambiguation techniques may be employed by OoO microprocessors that execute memory access instructions (e.g., loads and stores) that have been reordered. For example, memory disambiguation may be implemented using digital logic inside the microprocessor core to detect true dependencies between memory operations at execution time. This allows the processor to recover when a dependency has been violated.

In some systems, the memory disambiguation techniques may be unable to detect memory aliasing such as a reordering of some memory operations that cause a memory location access (e.g., load operation) to overlap with respect to an intermediate store instruction that modifies the location between the accesses. For example, the binary translator during optimization may reorder the load and store operations based on a particular optimization technique. In some situations, the system may perform memory alias checking by utilizing standalone hardware structures (e.g., certain registers along with an alias tracking table) that may be used to track any aliasing associated with the reordering of load and store operations. Using these standalone hardware structures to perform alias checking, however, may introduce varying costs, overheads and other types of complexities that adversely impact the performance of the OoO microprocessors.

Implementations of the disclosure address these performance shortcomings by extending a memory disambiguation mechanism to identify aliasing for speculative memory reordering operations without introducing new hardware structures to perform alias checking. The techniques provided herein may be advantageous for supporting binary translation alias detection without increasing system overhead by using existing memory disambiguation hardware to track and resolve problems associated with reordering memory operations. In some implementations, a binary translator may incorporate a "protection" or P-bit field (e.g., a bit flag) into memory access instructions (e.g., load instructions) associated with a particular memory location. When the binary translator enables the protection field (e.g., set the bit flag to 1), this indicates that the corresponding load instruction is protected and checked against possible any aliasing associated with the load's memory access operation. In this regard, the load instruction is checked by subsequent instructions that modify the particular memory location (e.g., store instructions) for the aliasing violations. If an aliasing is detected, then a fault is generated and corrective measures may be taken, such as the retranslation of code without the selective reordering operation that caused the fault.

In some implementations, store instructions that modify the particular memory location define the bounds of an alias set (i.e., a protected set of consecutive instructions). For example, the alias set may identify a grouping of speculative memory accesses (e.g., load instructions). In this regard, a store instruction of the same alias set clears the protection status of all instructions inside of the alias set. For example, if the processor (when executing the store instruction) does not detect an aliasing violation associated with the protected older load instruction, the protection field of the load instruction is disabled or cleared (e.g., set the bit flag to 0) at retirement of a corresponding store operation. For example, a store operation associated with an executed store instruction is usually queued in cache until it reaches a retirement point, then the store writes its value to a memory location. In some implementations, the binary translator may instruct the store operation to clear the protection field by enabling a "cleared" or C-bit field (e.g., a bit flag) of the corresponding store instruction.

FIG. 1 illustrates a block diagram of a processing device 100 to support binary translation alias detection according to one embodiment. The processing device 100 may be generally referred to as "processor" or "CPU". "Processor" or "CPU" herein shall refer to a device capable of executing instructions encoding, logical, or I/O operations. In one illustrative example, a processor may include an arithmetic logic unit (ALU), a control unit, and a plurality of registers. In a further aspect, a processor may include one or more processing cores, and hence may be a single core processor which is typically capable of processing a single instruction pipeline, or a multi-core processor which may simultaneously process multiple instruction pipelines. In another aspect, a processor may be implemented as a single integrated circuit, two or more integrated circuits, or may be a component of a multi-chip module (e.g., in which individual microprocessor dies are included in a single integrated circuit package and hence share a single socket).

As shown in FIG. 1, processing device 100 may include various components. In one embodiment, processing device 100 may include one or more processors cores 110 and a memory controller unit 120, among other components, coupled to each other as shown. The processing device 100 may also include a communication component (not shown) that may be used for point-to-point communication between various components of the processing device 100. The processing device 100 may be used in a computing system (not shown) that includes, but is not limited to, a desktop computer, a tablet computer, a laptop computer, a netbook, a notebook computer, a personal digital assistant (PDA), a server, a workstation, a cellular telephone, a mobile computing device, a smart phone, an Internet appliance or any other type of computing device. In another embodiment, the processing device 100 may be used in a system on a chip (SoC) system. In one embodiment, the SoC may comprise processing device 100 and a memory. The memory for one such system is a DRAM memory. The DRAM memory can be located on the same chip as the processor and other system components. Additionally, other logic blocks such as a memory controller or graphics controller can also be located on the chip.

The processor core(s) 110 may execute instructions for the processing device 100. The instructions may include, but are not limited to, pre-fetch logic to fetch instructions, decode logic to decode the instructions, execution logic to execute instructions and the like. The computing system may be representative of processing systems based on the Pentium® family of processors and/or microprocessors available from Intel® Corporation of Santa Clara, Calif., although other systems (including computing devices having other microprocessors, engineering workstations, set-top boxes and the like) may also be used. In one embodiment, a sample computing system may execute a version of an operating system, embedded software, and/or graphical user interfaces. Thus, embodiments of the disclosure are not limited to any specific combination of hardware circuitry and software.

In an illustrative example, processing core 110 may have a micro-architecture including processor logic and circuits. Processor cores with different micro-architectures can share at least a portion of a common instruction set. For example, similar register architectures may be implemented in different ways in different micro-architectures using various techniques, including dedicated physical registers, one or more dynamically allocated physical registers using a register renaming mechanism (e.g., the use of a register alias table (RAT), a reorder buffer (ROB) and a retirement register file).

Memory controller 120 may perform functions that enable the processing device 100 to access and communicate with memory (not shown) that includes a volatile memory and/or a non-volatile memory. In some embodiments, the memory controller 120 may be located on a processor die associated with processing device 100, while the memory is located off the processor die. In some embodiments, the processing device 100 includes a cache unit 130 to cache instructions and/or data. The cache unit 130 includes, but is not limited to, a level one (L1) 132, level two (L2) 134, and a last level cache (LLC) 136, or any other configuration of the cache memory within the processing device 100. In some embodiments, the L1 cache 132 and L2 cache 134 can transfer data to and from the LLC 136. In one embodiment, the memory controller 120 can be connected to the LLC 136 to transfer data between the cache unit 130 and memory. As shown, the cache unit 130 can be integrated into the processing cores 110. The cache unit 130 may store data (e.g., including instructions) that are utilized by one or more components of the processing device 100.

In some embodiments, the processing device 100 may comprise a memory order buffer (MOB) 140. The MOB 140 may act as an initial gateway for holding a certain order of instructions (e.g., load and store instructions) that are to be executed, for example, by the processing cores 110. As shown, the MOB 140 may include one or more load buffers 142 and store buffers 144 to, respectively, hold copies of load and store instructions. In some implementations, a load buffer ID (LBID) may accompany every load instruction in the load buffers 142 and a store buffer ID (SBID) may accompany every store instruction in the store buffers 144. The LBID and SBID may each be an identifier corresponding to a location of the load or store instructions within the load buffers 142 and store buffers 144, respectively. The MOB 140 controls dispatching, buffers all store and load operations, tracks their progress as they move through execution, and then retires (commits them to main memory) as appropriate.

In some embodiments, the processing device 100 may comprise a binary translator 150 and an instruction stream 151. In some embodiments, the processing device 100 may include a front end (not shown) to receive or retrieve instruction stream 151 from any suitable location, including a cache (e.g. cache 130) or memory. The front end may include an instruction decoder (not shown) to decode the instruction stream 151 into micro-operations for execution.

In some embodiments, the binary translator 150 may comprise hardware (e.g., circuitry, dedicated logic, programmable logic, microcode, etc.), software (such as instructions run on a processing device), or a combination thereof. In one embodiment, the binary translator 150 translates or converts micro-operations associated with the input instruction streams 151 into (translated) code. This may include, but not limited to, "reordering" and "optimizing" an execution of the micro-operations by the processing device 100. Reordering a sequence of instructions typically involves changing an order of memory operations, for example, for loading, executing, and/or storing instructions. While optimizing the micro-operations of the input instruction streams 151 may include conditional executing certain instructions based on a particular condition being satisfied.

In operation, the binary translator 150 translates/decodes each of the micro-operations associate with the input instruction streams 151 into a corresponding sequence of code that direct the processing device 100 to perform certain operations. In some implementations, the binary translator 150 may reorder memory operations associated with input instruction streams 151 in accordance with certain optimization techniques. As noted, when the binary translator 150 reorders the memory operations, the operations may need to be checked at run time to detect any memory aliasing associated with certain instructions.

Embodiments of the present disclosure provide techniques for the processing device 100 to support binary translation alias detection. In some implementations, the binary translator 150 may include alias detection logic 154 that directs the translator to incorporate a P-bit flag $155^1$ and C-bit flag $155^2$, and alias set (ASET) identifier $157^1$ and $157^2$ into certain instructions that are part of speculative reordering operations. In some implementations, the P-bit flag $155^1$ includes a bit that can be set to a value (e.g., value 1 or 0) depending on a type of the corresponding instruction in the load buffer 142. For example, the binary translator 150 may enable a protection field of the P-bit flag $155^1$ in certain load instructions. In one implementation, the protection field may be enabled (e.g., setting the P-bit flag $155^1$ to 1) to indicate that the load instruction is to be protected and checked by a subsequent store instruction for an indication of an aliasing address associated with a memory location of the load instruction.

In other implementations, the binary translator 150 may enable a cleared field of the C-bit flag $155^2$ in certain store instructions in the store buffers 144. In such cases, the cleared field may be enabled (e.g., setting the C-bit flag $155^2$ to 1) to indicate the protection for an older or preceding load instruction is to be cleared when the store instruction is retired. In this regard, the store instruction may indicate a boundary for a group of instructions in which the speculative reordering operations end. For example, the binary translator 150 may incorporate the ASET identifier $157^1$ and $157^2$ of the group of instructions into the store instruction. This store instruction when executed may disable the protection field for protected load instruction identified by the ASET identifier $157^1$ and $157^2$ to indicate that protection for those instructions is ended.

In some implementations, the ASET identifier $157^1$ and $157^2$ includes a bit that can be set to a value (e.g., 0, 1, 2, 3 and etc.) that identifies a particular alias set. Each alias set comprises a group of speculative memory access (e.g., load instructions) the boundary of which is defined by a memory modifying instruction (e.g., a store instruction). In one implementation, each alias set is defined by the last store instructions among all the store instructions over which one or more load instructions have been speculatively reorder. For example, consider following the code snippet:

1) ST [A]
2) LD [B]
3) ST [C]
4) ST [D]
5) LD [E]
6) LD [F]

If the binary translator 150 speculatively reorders all load (LD) instructions over the store (ST) instructions, then load instruction 2 would speculate over store instruction 1, and load instructions 5 and 6 would speculate over store instructions 1, 3, and 4, resulting in:

2) LD [B]
5) LD [E]
6) LD [F]
1) ST [A]
3) ST [C]
4) ST [D]

In this example, instruction 2 belongs to an alias set associated with boundary-defining instruction 1 because instruction 1 is the only memory-modifying instruction (e.g., store instruction speculated over by instruction 2. Instructions 5 and 6 belong to an alias set associated with boundary-defining instruction 4, as instruction 4 is the last of all store instructions (e.g., instructions 1, 3 and 4) that were speculated over by instructions 5 and 6. Instruction 4 is the last store instruction of the instructions 1, 3 and 4 because it would have been executed last in the sequence if the instructions have been executed in order. Thus, the binary translator 150 may update the ASET identifier $157^1$ and $157^2$ for the instructions to indicate that two (2) alias sets are created with a store instruction defining each of the alias sets as follows:

2) LD [B]—Alias Set 0
5) LD [E]—Alias Set 1
6) LD [F]—Alias Set 1
1) ST [A]—Defines Boundary of Alias Set 0
3) ST [C]
4) ST [D]—Defines Boundary of Alias Set 1

Based on the enablement of the P-bit flag $155^1$, the reorder load instructions 2, 5 and 6 will be protected and the execution of the alias-set defining stores may clear that protection for the loads in the alias set. For example, by enabling the C-bit flag $155^2$ of the store instructions, such as instruction 4, it is instructed to clear the protection of the protected loads in the same alias set. An example of this protection mechanism is further discussed below with reference to FIG. 2.

Figure 2:
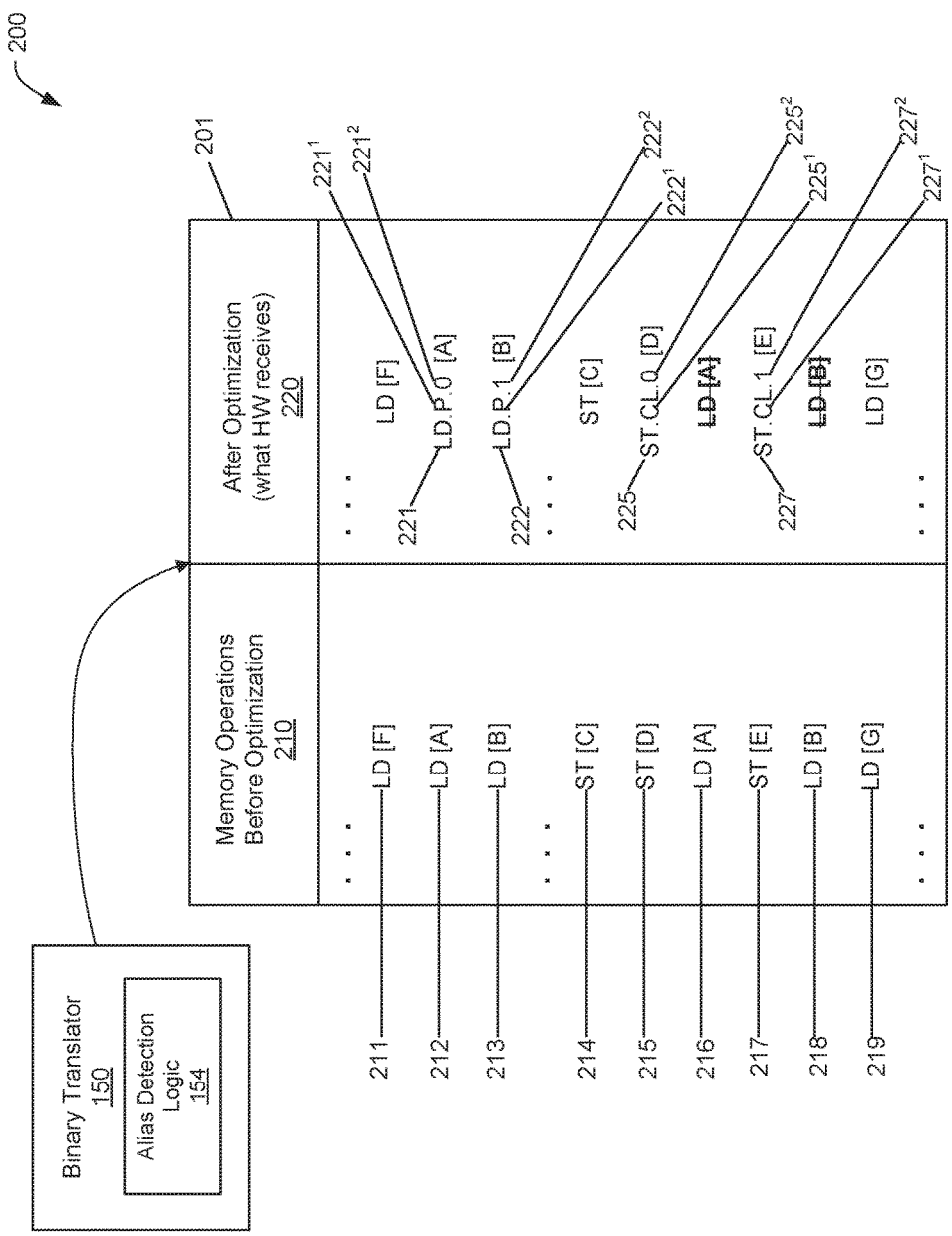
FIG. 2 illustrates a block diagram of a system including a memory for supporting alias detection in an out-of-order processor according to one embodiment.

FIG. 2 illustrates a block diagram of a system 200 including a memory 201 for supporting binary translation alias detection in an out-of-order processor according to one embodiment. In some implementations, the binary translator 150 of FIG. 1 may identify a plurality of instructions 210 in memory 201. In this example, the plurality of instructions 210 may include a number of load and store instructions 211-219 that are in a particular program order.

In some implementations, the binary translator 150 may reorder the instructions in accordance with a certain optimization technique. For example, the binary translator 150 can take the plurality of instructions 210 and generate optimized instructions 220 that the processor receives for execution. In one example, the binary translator 150 may identify a first load and a second load that is to be eliminated using the earlier first load. For example, the binary translator 150 may speculative reorder the instructions by eliminating loads 216 LD [A] and 218 LD [B] based on the earlier similar first loads 212 LD [A] and 213 LD [B], respectively. In this example, each second load may be a redundant load that may access a value from a memory location from which the earlier first loads 212 LD [A] and 213 LD [B] have already obtained that value.

In some implementations, when reordering the operations, the binary translator 150 (as direct by the alias detection logic 154) enables the protection field (e.g., set to 1) of the first load to indicate that the load operation is to be protected. Thereafter, the load instruction is to be checked for any aliasing associated with its memory access operation when the following store operation is detected. As shown in FIG. 2, the binary translator 150 enables the protection field of the load instruction 212 for it to become speculative access 221 and load instruction 213 becomes speculative access 222. In this example, the "P" 221[1] and 222[1] annotations indicate protection for the instructions. The numbers 221[2] and 222[2] associated with the annotations indicate the alias set associated with the load operations.

As shown in FIG. 2, the binary translator 150 also enables the C-bit field of the store instruction 215 for it to become store instruction 225 and store instruction 217 becomes store instruction 227. In this example, the "C" 225[1] and 227[1] annotations indicate clearing of the protection for the instructions when the respective store operation 225 and 227 are is executed. The numbers 225[2] and 227[2] associated with the annotations indicate the alias set associated with the corresponding load operations. In one implementation, when the store instructions 225 and 227 are executed, they clear the protection field (e.g., set the P-bit to 0) for each of the load instructions 221 and 222 that are in their respective alias set, so that protection of that particular load operation ends.

Figure 3:
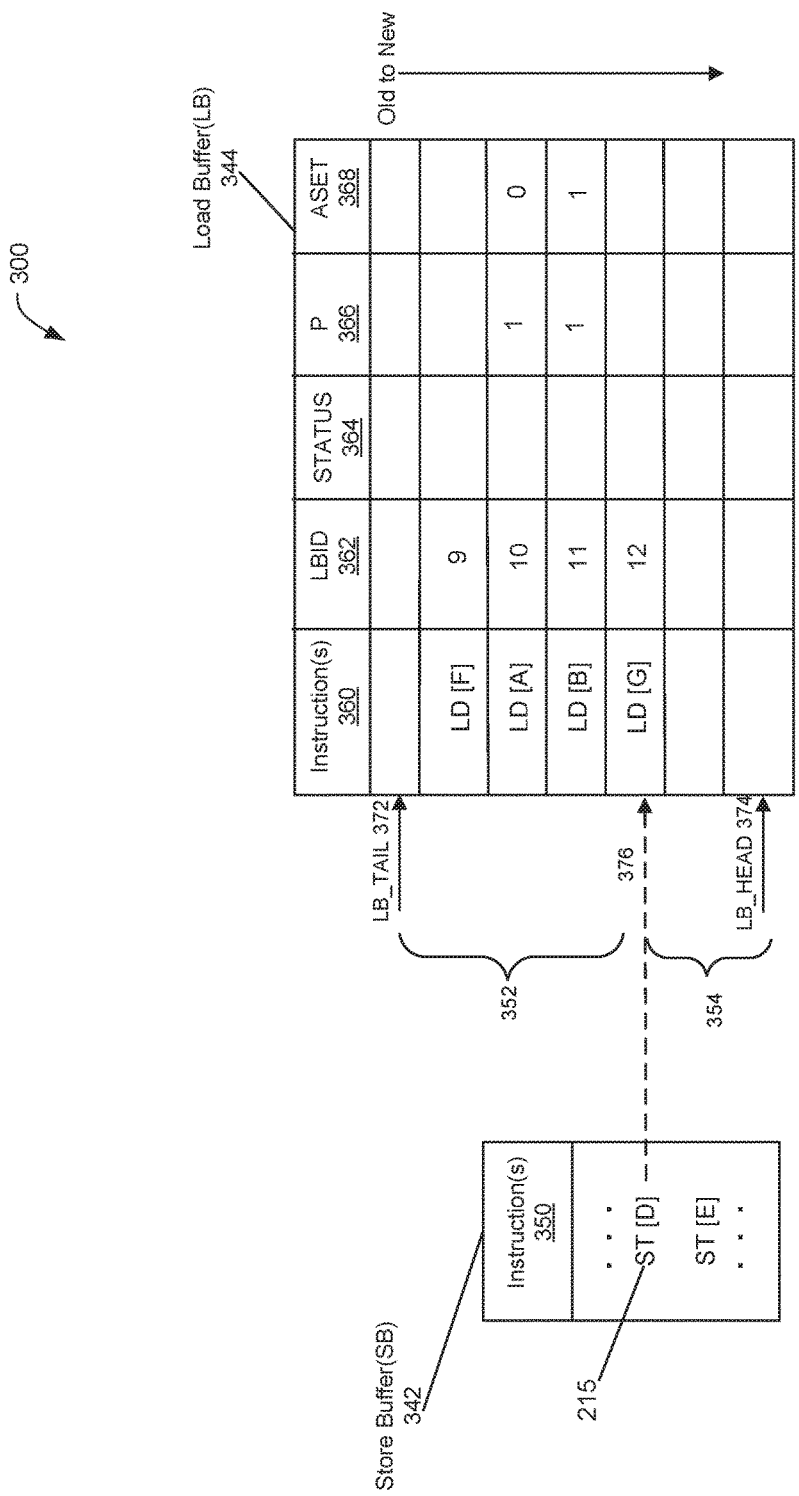
FIG. 3 illustrates a system including buffers for supporting binary translation alias detection in an out-of-order processor according to one embodiment.

FIG. 3 illustrates a system 300 including buffers 342 and 344 for supporting binary translation alias detection in an out-of-order processor according to one embodiment. In this example, the system 300 may be a system on-chip (SoC) that includes the processing device 100 of FIG. 1. In operation, the system 300 includes a store buffer 342 comprising store operations 350 waiting for execution and a load buffer 344 comprising load operations 360 waiting for execution. The load and store operations are stored in the buffers 342 and 344 until they retire, e.g., are committed to main memory. The operations are stored in buffers 342 and 344 to ensure processor ordering and to maintain memory consistency. In some implementations, the binary translator 150 may reorder operations from their original order before they are placed into the buffers 342 and 344 until execution.

In some implementations, each buffer is supported by a head pointer and a tail pointer that are managed by system 300 to provide the store buffer 342 and load buffer 344 with the necessary information regarding the entries that are currently in use in that buffer. As shown in FIG. 3, for example, the LB_TAIL pointer 372 of load buffer 344 indicates the oldest load in the processor. The LB_TAIL pointer 372 points to the load operation that will be performed first out of all the load operations in the load buffer 344. The LB_HEAD pointer 374 indicates the last entry in the load buffer 344 to be allocated to the buffer for execution. In one implementation, the load buffer (as well as the store buffer 342) is a circular buffer, such that the allocation and de-allocation of the load operations 360 wraps around the buffer in a circular fashion.

Each load and store operation is assigned an identifier. For example, the load operations may be assigned an identifier referred to herein as an LBID, corresponding to its eventual location in the load buffer 344. Similarly, the store operations may be assigned an identifier referred to herein as an SBID, corresponding to its eventual location in the store buffer 342. The status of the store and load operations may be written into the respective buffers 342 and 344. For example, the status of a load operation may be in a load status field 364 of the load buffer 362. In one implementation, the load status 364 may be one of four designations: invalid (e.g., a page miss error), valid (e.g., no memory errors), incomplete (e.g., still executing) and completed (e.g., finished execution). Each load gets written into its load buffer with the status and the load buffer uses this status to determine when the load operations are to execute.

To ensure that data dependency relationships have not been violated, as part of a memory disambiguation mechanism the store operation 215 (ST [D]) may check younger loads (marked by arrow 376) in the load buffer 344. These are loads that are executed after the store operation 215 in accordance with the original order of the operations. If the younger loads operation complete before the store operation 215, this indicates a data dependency violation and some corrective action should be taken (e.g., such as a re-execution of younger loads).

In accordance with the present disclosure to extend the memory disambiguation mechanism due to binary translation speculative optimizations, the store operation 215 (ST [D]) is configured to also check older loads that have the protection field 366 set (e.g., set to 1). In this case, checks are added for older loads with the protection field 366 set because a simple re-execution of loads is not enough to detect aliasing associated with the speculative optimizations. In some implementations, the store operation 215 (ST [D]) may check older load operations LD[A] and LD [B] in the load buffer 344 for an aliasing violation. If there is no such violation (such as an intervening store) is detected, the protected instructions are cleared (e.g., the protection field 366 is set to 0) subsequent to the execution of the store operation. If there is an aliasing violation detected, a fault may be reported to the system 300. In response, the system 300 may take corrective actions, such as a re-execution of younger loads. This is because there are issues with typical memory disambiguation mechanisms in checking younger loads. Thus, in the case of younger loads, a re-execution of the loads is performed.

If the older load operations (with the protection field 366 set) that are checked by the store operation are complete and an address alias is detected, a binary translation recovery mechanism may be initiated. For example, the binary translation recovery mechanism may include rollback of a set of operations to a previous checkpoint and re-executing the operations. If the recovery mechanism is initiated a threshold number of times for the same address, the system 300 may initiate a re-translation of the operations by the binary translator by restricting specific speculative optimizations.

If the older load operations (with the protection field 366 set) that are checked by the store operation are incomplete (e.g., they don't have an address yet due to younger ST executing first) and there is an alias detected, the store operation is marked for a second-level check at retirement. For incomplete older load operations, the store operation is blocked from executing until older loads have an address. If there are no incomplete older loads operation with P-bit set, but the store operation still have an alias fault, those stores are recirculated before retirement. This is to make sure that the alias fault is valid and not a false positive. In such a case, a block code in the store buffer is set to mark an entry for the store operation to recirculate.

During retirement, store operations that were marked for second-level check perform the binary translation alias detection check again on the older load operations with the protection field 366 set. If the aliasing is detected again, this may indicate that the aliasing is verified. In response, an alias fault or exception is raised indicating that a recovery action is to be performed. At retirement, the store operations that have a C-bit flag set, clears the protection field 366 from older loads that match their ASET ID 368. This ensures that there are no spurious faults.

Figure 4:
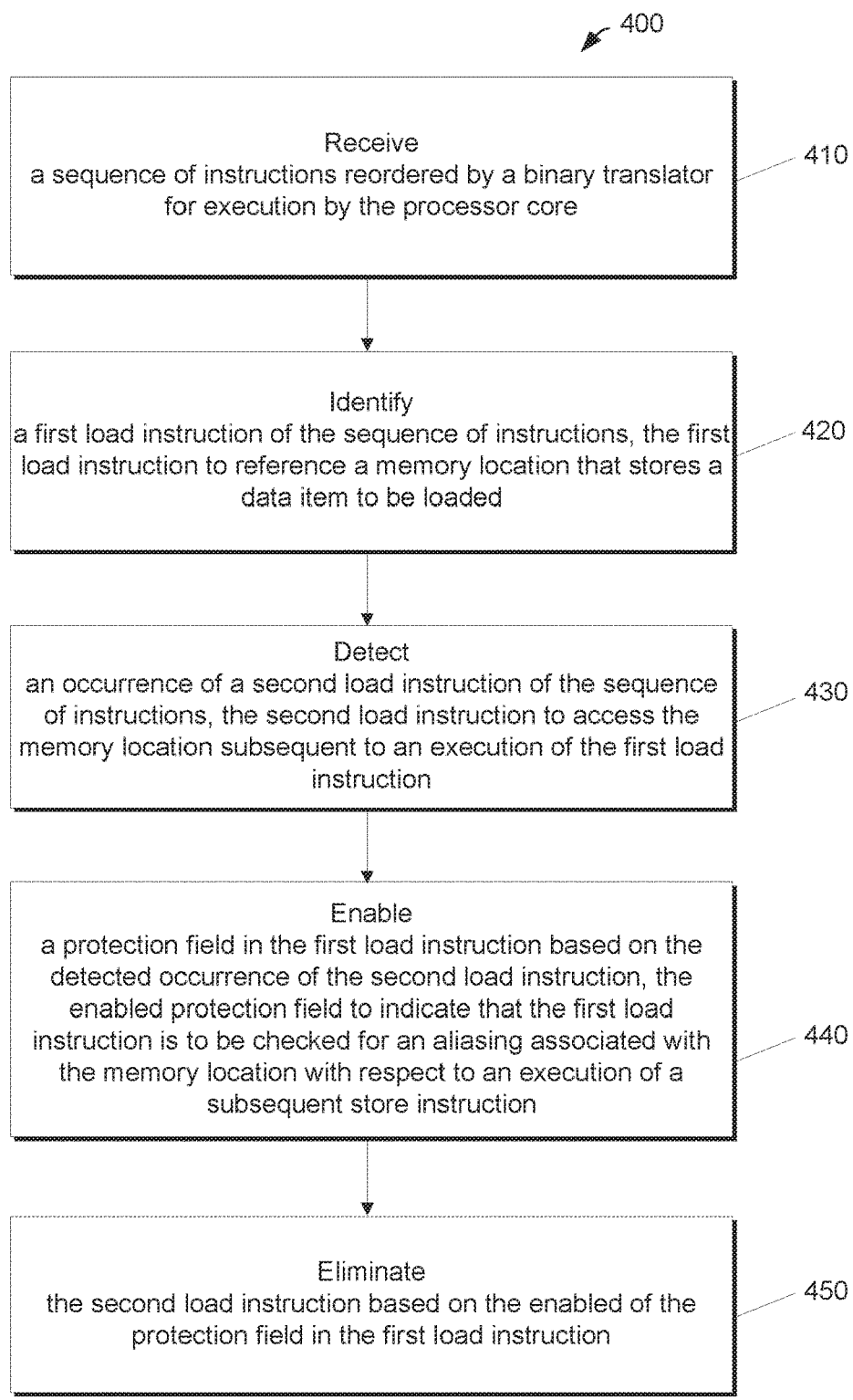
FIG. 4 illustrates a flow diagram of a method for protecting operations to support binary translation alias detection in an out-of-order processor according to one embodiment.

FIG. 4 illustrates a flow diagram of a method for protecting operations to support binary translation alias detection in an out-of-order processor according to one embodiment. Method 400 may be performed by processing logic that may comprise hardware (e.g., circuitry, dedicated logic, programmable logic, microcode, etc.), software (such as instructions run on a processing device), firmware, or a combination thereof. In one embodiment, the processing device 100 as directed by the alias detection logic 154 in FIG. 1 may perform method 400. Although shown in a particular sequence or order, unless otherwise specified, the order of the processes can be modified. Thus, the illustrated implementations should be understood only as examples, and the illustrated processes can be performed in a different order, and some processes may be performed in parallel. Additionally, one or more processes can be omitted in various embodiments. Thus, not all processes are required in every implementation. Other process flows are possible.

Method 400 begins at block 410 where a sequence of instructions reordered by a binary translator for execution by a processor core is received. A first load instruction of the sequence of instructions is detected. In block 420, the first load instruction to reference a memory location that stores a data item to be loaded is identified. An occurrence of a second load instruction of the sequence of instructions is detected in block 430. The second load instruction to access the memory location subsequent to an execution of the first load instruction. In block 440, a protection field in the first load instruction is enabled based on the detected occurrence of the second load instruction. The enabled protection field to indicate that the first load instruction is to be checked for an aliasing associated with the memory location with respect to an execution of a subsequent store instruction. In block 450, the second load instruction is eliminated based on the enabled of the protection field in the first load instruction.

Figure 5:
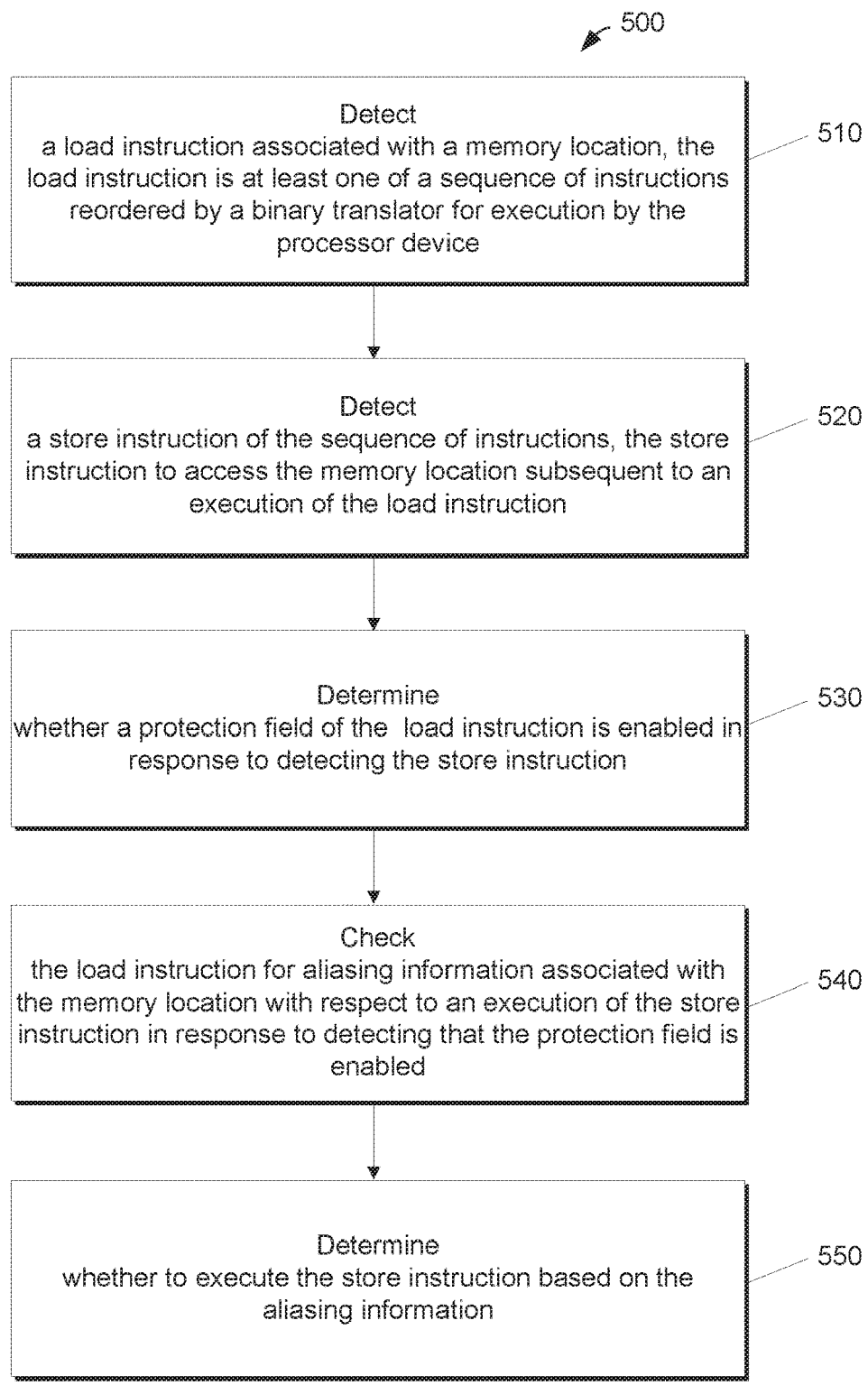
FIG. 5 illustrates a flow diagram of a method for checking protected operations to support binary translation alias detection in an out-of-order processor according to one embodiment.

FIG. 5 illustrates a flow diagram of a method for checking protected operations to support binary translation alias detection in an out-of-order processor according to one embodiment. Method 500 may be performed by processing logic that may comprise hardware (e.g., circuitry, dedicated logic, programmable logic, microcode, etc.), software (such as instructions run on a processing device), firmware, or a combination thereof. In one embodiment, the processing device 100 as directed by the alias detection logic 154 in FIG. 1 may perform method 500. Although shown in a particular sequence or order, unless otherwise specified, the order of the processes can be modified. Thus, the illustrated implementations should be understood only as examples, and the illustrated processes can be performed in a different order, and some processes may be performed in parallel. Additionally, one or more processes can be omitted in various embodiments. Thus, not all processes are required in every implementation. Other process flows are possible.

Method 500 begins at block 510 where a load instruction associated with a memory location is detected. The load instruction is at least one of a sequence of instructions reordered by a binary translator for execution by the processor device. In block 520, a store instruction of the sequence of instructions is detected. The store instruction to access the memory location subsequent to an execution of the load instruction Responsive to detecting the store instruction, it is determined whether a protection field of the load instruction is enabled in block 530. Responsive to detecting the protection field is enabled, the load instruction is checked in block 540 for aliasing information associated with the memory location with respect to an execution of the store instruction. In block 550, it is determined whether to execute the store instruction based on the aliasing information.

FIG. 6A is a block diagram illustrating a micro-architecture for a processor 600 that implements techniques for supporting binary translation alias detection in an out-of-order processor in accordance with one embodiment of the disclosure. Specifically, processor 600 depicts an in-order architecture core and a register renaming logic, out-of-order issue/execution logic to be included in a processor according to at least one embodiment of the disclosure.

Processor 600 includes a front end unit 630 coupled to an execution engine unit 650, and both are coupled to a memory unit 670. The processor 600 may include a reduced instruction set computing (RISC) core, a complex instruction set computing (CISC) core, a very long instruction word (VLIW) core, or a hybrid or alternative core type. As yet another option, processor 600 may include a special-purpose core, such as, for example, a network or communication core, compression engine, graphics core, or the like. In one embodiment, processor 600 may be a multi-core processor or may part of a multi-processor system.

The front end unit 630 includes a branch prediction unit 632 coupled to an instruction cache unit 634, which is coupled to an instruction translation lookaside buffer (TLB) 636, which is coupled to an instruction fetch unit 638, which is coupled to a decode unit 640. The decode unit 640 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 640 may be implemented using various different mechanisms. Examples of suitable mechanisms include, but are not limited to, look-up tables, hardware implementations, programmable logic arrays (PLAs), microcode read only memories (ROMs), etc. The instruction cache unit 634 is further coupled to the memory unit 670. The decode unit 640 is coupled to a rename/allocator unit 652 in the execution engine unit 650.

The execution engine unit 650 includes the rename/allocator unit 652 coupled to a retirement unit 654 and a set of one or more scheduler unit(s) 656. The scheduler unit(s)

656 represents any number of different schedulers, including reservations stations (RS), central instruction window, etc. The scheduler unit(s) 656 is coupled to the physical register file(s) unit(s) 658. Each of the physical register file(s) units 658 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 658 is overlapped by the retirement unit 654 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.). The execution engine unit 650 may include for example a power management unit (PMU) 690 that governs power functions of the functional units.

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 654 and the physical register file(s) unit(s) 658 are coupled to the execution cluster(s) 660. The execution cluster(s) 660 includes a set of one or more execution units 662 and a set of one or more memory access units 664. The execution units 662 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 656, physical register file(s) unit(s) 658, and execution cluster(s) 660 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 664). It should also be understood that where separate pipelines are used, one or more of these pipelines may be out-of-order issue/execution and the rest in-order.

The set of memory access units 664 is coupled to the memory unit 670, which may include a data prefetcher 680, a data TLB unit 672, a data cache unit (DCU) 674, and a level 2 (L2) cache unit 676, to name a few examples. In some embodiments DCU 674 is also known as a first level data cache (L1 cache). The DCU 674 may handle multiple outstanding cache misses and continue to service incoming stores and loads. It also supports maintaining cache coherency. The data TLB unit 672 is a cache used to improve virtual address translation speed by mapping virtual and physical address spaces. In one exemplary embodiment, the memory access units 664 may include a load unit, a store address unit, and a store data unit, each of which is coupled to the data TLB unit 672 in the memory unit 670. The L2 cache unit 676 may be coupled to one or more other levels of cache and eventually to a main memory.

In one embodiment, the data prefetcher 680 speculatively loads/prefetches data to the DCU 674 by automatically predicting which data a program is about to consume. Prefetching may refer to transferring data stored in one memory location of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

Figure 6:
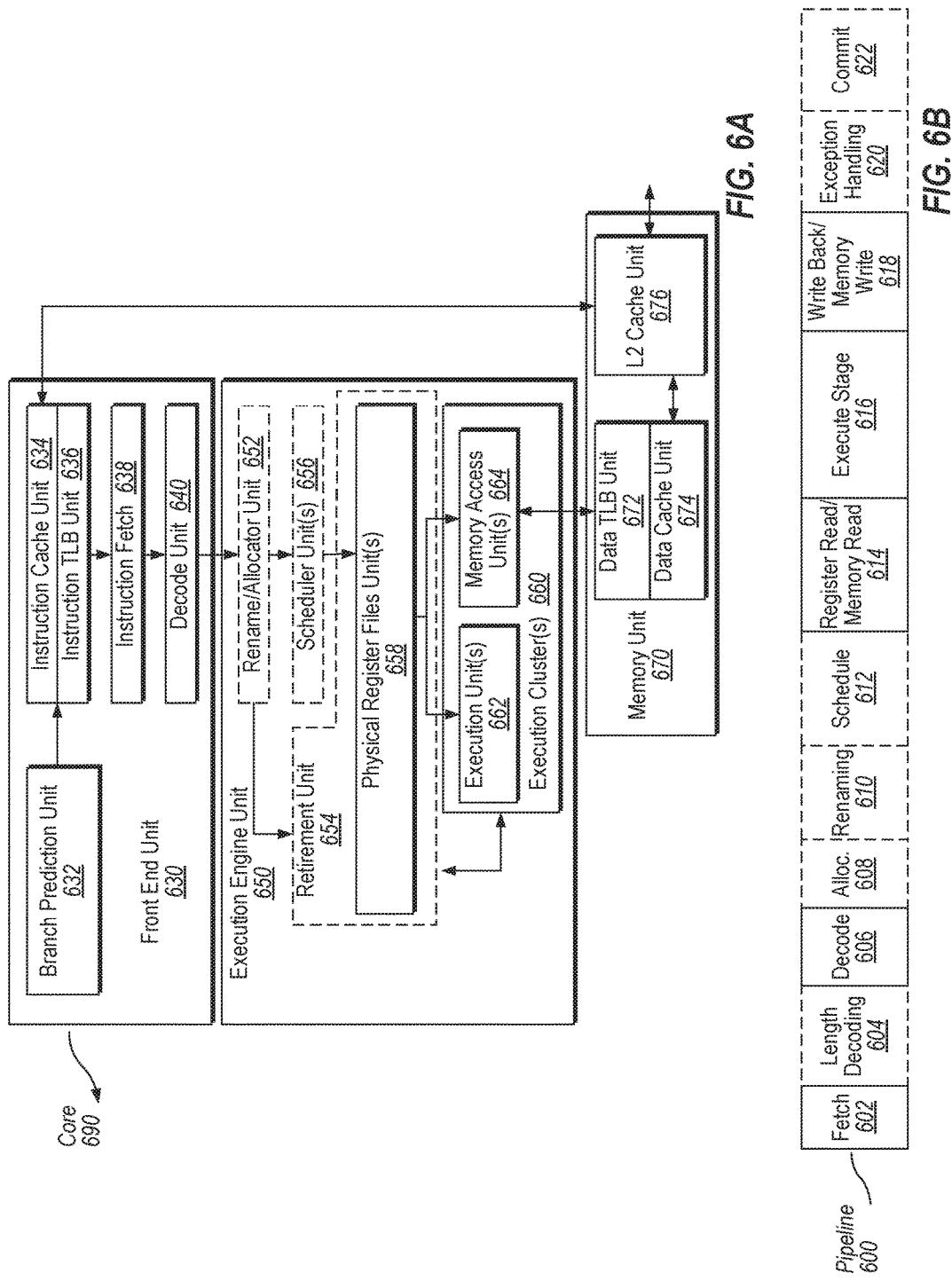
FIG. 6A is a block diagram illustrating a micro-architecture for a processor according to an implementation of the disclosure.
FIG. 6B is a block diagram illustrating an in-order pipeline and a register renaming stage, out-of-order issue/execution pipeline according to an implementation of the disclosure.

In one implementation, processor 600 may be the same as processing system 100 described with respect to FIG. 6 to support binary translation alias detection in an out-of-order a processing device described with respect to implementations of the disclosure.

The processor 600 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

FIG. 6B is a block diagram illustrating an in-order pipeline and a register renaming stage, out-of-order issue/execution pipeline implemented by processor 600 of FIG. 6A according to some embodiments of the disclosure. The solid lined boxes in FIG. 6B illustrate an in-order pipeline, while the dashed lined boxes illustrates a register renaming, out-of-order issue/execution pipeline. In FIG. 6B, a processor pipeline 601 includes a fetch stage 602, a length decode stage 604, a decode stage 606, an allocation stage 608, a renaming stage 610, a scheduling (also known as a dispatch or issue) stage 612, a register read/memory read stage 614, an execute stage 616, a write back/memory write stage 618, an exception handling stage 622, and a commit stage 624. In some embodiments, the ordering of stages 602-624 may be different than illustrated and are not limited to the specific ordering shown in FIG. 6B.

Figure 7:
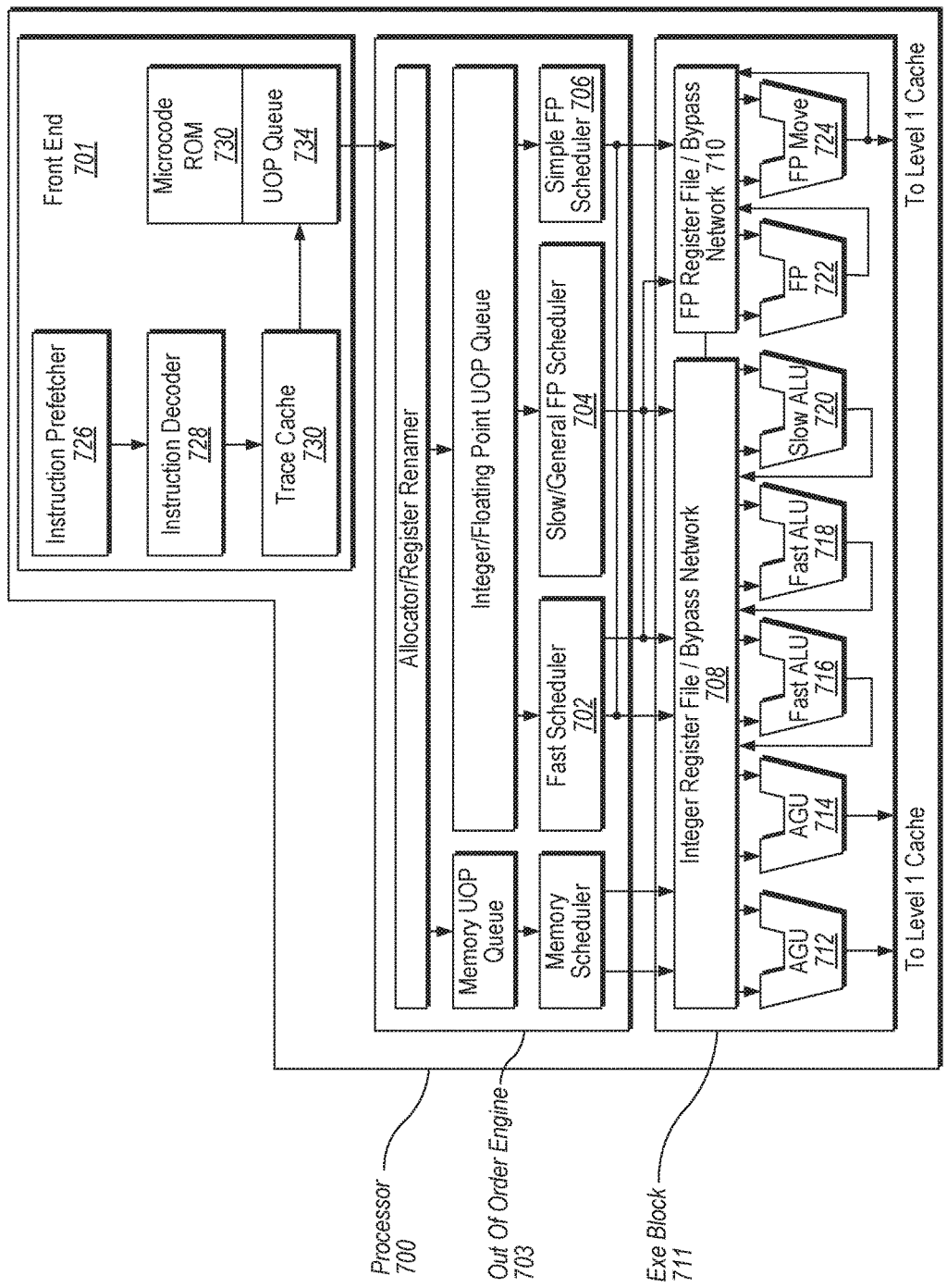
FIG. 7 is a block diagram illustrating a micro-architecture for a processor in accordance with one implementation of the disclosure.

FIG. 7 illustrates a block diagram of the micro-architecture for a processor 700 that includes logic circuits to implement techniques for supporting binary translation alias detection in an out-of-order processor in accordance with one embodiment of the disclosure. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 701 is the part of the processor 700 that fetches instructions to be executed and prepares them to be used later in the processor pipeline.

The front end 701 may include several units. In one embodiment, the instruction prefetcher 726 fetches instructions from memory and feeds them to an instruction decoder 728 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 730 takes decoded uops and assembles them into program ordered sequences or traces in the uop queue 734 for execution. When the trace cache 730 encounters a complex instruction, the microcode ROM 732 provides the uops needed to complete the operation.

Some instructions are converted into a single micro-op, whereas others need several micro-ops to complete the full operation. In one embodiment, if more than four micro-ops are needed to complete an instruction, the decoder 728 accesses the microcode ROM 732 to do the instruction. For one embodiment, an instruction can be decoded into a small number of micro ops for processing at the instruction decoder 728. In another embodiment, an instruction can be stored within the microcode ROM 732 should a number of micro-ops be needed to accomplish the operation. The trace cache 730 refers to an entry point programmable logic array (PLA) to determine a correct micro-instruction pointer for reading the micro-code sequences to complete one or more instructions in accordance with one embodiment from the micro-code ROM 732. After the microcode ROM 732 finishes sequencing micro-ops for an instruction, the front end 701 of the machine resumes fetching micro-ops from the trace cache 730.

The out-of-order execution engine 703 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 702, slow/general floating point scheduler 704, and simple floating point scheduler 706. The uop schedulers 702, 704, 706, determine when a uop is ready to execute based on the readiness of their dependent input register operand sources and the availability of the execution resources the uops need to complete their operation. The fast scheduler 702 of one embodiment can schedule on each half of the main clock cycle while the other schedulers can only schedule once per main processor clock cycle. The schedulers arbitrate for the dispatch ports to schedule uops for execution.

Register files 708, 710, sit between the schedulers 702, 704, 706, and the execution units 712, 714, 716, 718, 720, 722, 724 in the execution block 711. There is a separate register file 708, 710, for integer and floating point operations, respectively. Each register file 708, 710, of one embodiment also includes a bypass network that can bypass or forward just completed results that have not yet been written into the register file to new dependent uops. The integer register file 708 and the floating point register file 710 are also capable of communicating data with the other. For one embodiment, the integer register file 708 is split into two separate register files, one register file for the low order 32 bits of data and a second register file for the high order 32 bits of data. The floating point register file 710 of one embodiment has 128 bit wide entries because floating point instructions typically have operands from 64 to 128 bits in width.

The execution block 711 contains the execution units 712, 714, 716, 718, 720, 722, 724, where the instructions are actually executed. This section includes the register files 708, 710, that store the integer and floating point data operand values that the micro-instructions need to execute. The processor 700 of one embodiment is comprised of a number of execution units: address generation unit (AGU) 712, AGU 714, fast ALU 716, fast ALU 718, slow ALU 720, floating point ALU 722, floating point move unit 724. For one embodiment, the floating point execution blocks 722, 724, execute floating point, MMX, SIMD, and SSE, or other operations. The floating point ALU 722 of one embodiment includes a 64 bit by 64 bit floating point divider to execute divide, square root, and remainder micro-ops. For embodiments of the disclosure, instructions involving a floating point value may be handled with the floating point hardware.

In one embodiment, the ALU operations go to the high-speed ALU execution units 716, 718. The fast ALUs 716, 718, of one embodiment can execute fast operations with an effective latency of half a clock cycle. For one embodiment, most complex integer operations go to the slow ALU 720 as the slow ALU 720 includes integer execution hardware for long latency type of operations, such as a multiplier, shifts, flag logic, and branch processing. Memory load/store operations are executed by the AGUs 712, 714. For one embodiment, the integer ALUs 716, 718, 720, are described in the context of performing integer operations on 64 bit data operands. In alternative embodiments, the ALUs 716, 718, 720, can be implemented to support a variety of data bits including 16, 32, 128, 256, etc. Similarly, the floating point units 722, 724, can be implemented to support a range of operands having bits of various widths. For one embodiment, the floating point units 722, 724, can operate on 128 bits wide packed data operands in conjunction with SIMD and multimedia instructions.

In one embodiment, the uops schedulers 702, 704, 706, dispatch dependent operations before the parent load has finished executing. As uops are speculatively scheduled and executed in processor 700, the processor 700 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 700 also includes logic to implement store address prediction for memory disambiguation according to embodiments of the disclosure. In one embodiment, the execution block 711 of processor 700 may include a store address predictor (not shown) for implementing techniques for supporting binary translation alias detection in an out-of-order processor in accordance with one embodiment of the disclosure.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 8:
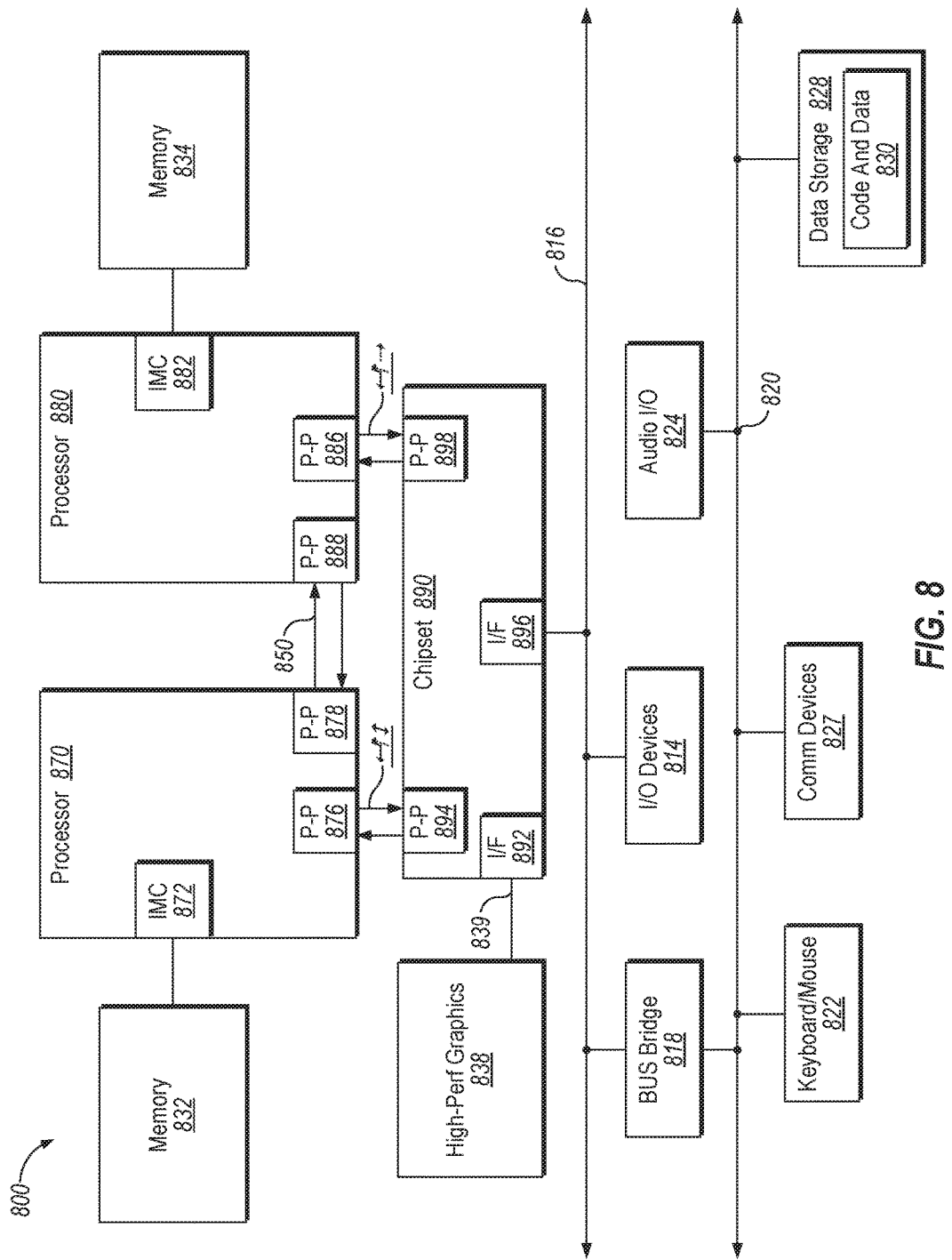
FIG. 8 is a block diagram illustrating a system in which an implementation of the disclosure may be used.

Embodiments may be implemented in many different system types. Referring now to FIG. 8, shown is a block diagram illustrating a system 800 in which an embodiment of the disclosure may be used. As shown in FIG. 8, multiprocessor system 800 is a point-to-point interconnect system, and includes a first processor 870 and a second processor 880 coupled via a point-to-point interconnect 850. While shown with only two processors 870, 880, it is to be understood that the scope of embodiments of the disclosure is not so limited. In other embodiments, one or more additional processors may be present in a given processor. In one embodiment, the multiprocessor system 800 may implement techniques for supporting binary translation alias detection in an out-of-order processor as described herein.

Processors 870 and 880 are shown including integrated memory controller units 872 and 882, respectively. Processor 870 also includes as part of its bus controller units point-to-point (P-P) interfaces 876 and 878; similarly, second processor 880 includes P-P interfaces 886 and 888. Processors 870, 880 may exchange information via a point-to-point (P-P) interface 850 using P-P interface circuits 878, 888. As shown in FIG. 8, IMCs 872 and 882 couple the processors to respective memories, namely a memory 832 and a memory 834, which may be portions of main memory locally attached to the respective processors.

Processors 870, 880 may exchange information with a chipset 890 via individual P-P interfaces 852, 854 using point to point interface circuits 876, 894, 886, 898. Chipset 890 may also exchange information with a high-performance graphics circuit 838 via a high-performance graphics interface 839.

A shared cache (not shown) may be included in either processor or outside of both processors, yet connected with the processors via P-P interconnect, such that either or both processors' local cache information may be stored in the shared cache if a processor is placed into a low power mode.

Chipset 890 may be coupled to a first bus 816 via an interface 896. In one embodiment, first bus 816 may be a Peripheral Component Interconnect (PCI) bus, or a bus such as a PCI Express bus or another third generation I/O interconnect bus, although the scope of the disclosure is not so limited.

As shown in FIG. 8, various I/O devices 814 may be coupled to first bus 816, along with a bus bridge 818, which couples first bus 816 to a second bus 820. In one embodiment, second bus 820 may be a low pin count (LPC) bus. Various devices may be coupled to second bus 820 including, for example, a keyboard and/or mouse 822, communication devices 827 and a storage unit 828 such as a disk drive or other mass storage device, which may include instructions/code and data 830, in one embodiment. Further, an audio I/O 824 may be coupled to second bus 820. Note that other architectures are possible. For example, instead of the point-to-point architecture of FIG. 8, a system may implement a multi-drop bus or other such architecture.

Figure 9:
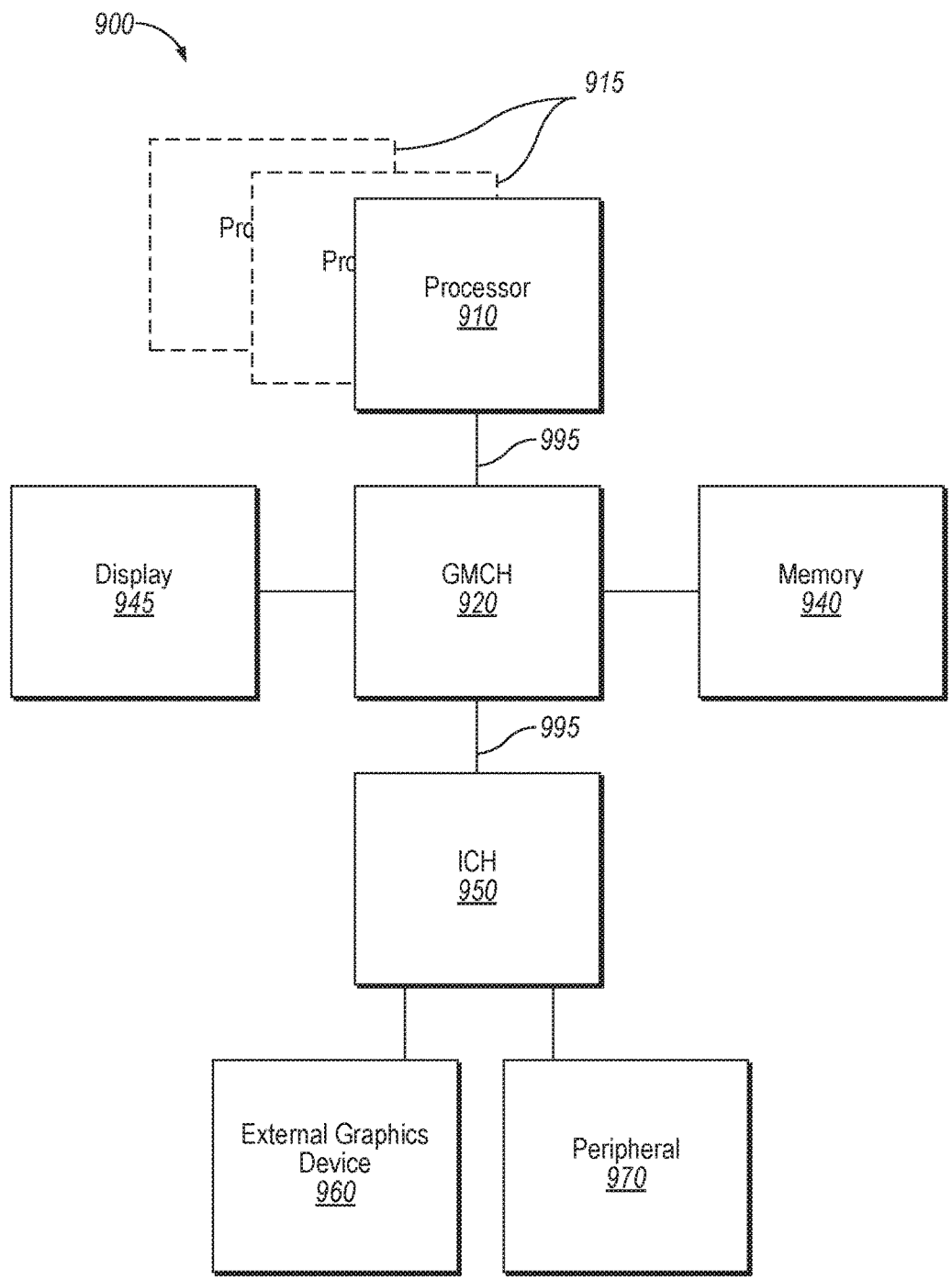
FIG. 9 is a block diagram illustrating a system in which an implementation of the disclosure may operate.

Referring now to FIG. 9, shown is a block diagram of a system 900 in which one embodiment of the disclosure may operate. The system 900 may include one or more processors 910, 915, which are coupled to graphics memory controller hub (GMCH) 920. The optional nature of additional processors 915 is denoted in FIG. 9 with broken lines. In one embodiment, processors 910, 915 support binary translation alias detection in an out-of-order processor according to embodiments of the disclosure.

Each processor 910, 915 may be some version of the circuit, integrated circuit, processor, and/or silicon integrated circuit as described above. However, it should be noted that it is unlikely that integrated graphics logic and integrated memory control units would exist in the processors 910, 915. FIG. 9 illustrates that the GMCH 920 may be coupled to a memory 940 that may be, for example, a dynamic random access memory (DRAM). The DRAM may, for at least one embodiment, be associated with a non-volatile cache.

The GMCH 920 may be a chipset, or a portion of a chipset. The GMCH 920 may communicate with the processor(s) 910, 915 and control interaction between the processor(s) 910, 915 and memory 940. The GMCH 920 may also act as an accelerated bus interface between the processor(s) 910, 915 and other elements of the system 900. For at least one embodiment, the GMCH 920 communicates with the processor(s) 910, 915 via a multi-drop bus, such as a frontside bus (FSB) 995.

Furthermore, GMCH 920 is coupled to a display 945 (such as a flat panel or touchscreen display). GMCH 920 may include an integrated graphics accelerator. GMCH 920 is further coupled to an input/output (I/O) controller hub (ICH) 950, which may be used to couple various peripheral devices to system 900. Shown for example in the embodiment of FIG. 9 is an external graphics device 960, which may be a discrete graphics device, coupled to ICH 950, along with another peripheral device 970.

Alternatively, additional or different processors may also be present in the system 900. For example, additional processor(s) 915 may include additional processors(s) that are the same as processor 910, additional processor(s) that are heterogeneous or asymmetric to processor 910, accelerators (such as, e.g., graphics accelerators or digital signal processing (DSP) units), field programmable gate arrays, or any other processor. There can be a variety of differences between the processor(s) 910, 915 in terms of a spectrum of metrics of merit including architectural, micro-architectural, thermal, power consumption characteristics, and the like. These differences may effectively manifest themselves as asymmetry and heterogeneity amongst the processors 910, 915. For at least one embodiment, the various processors 910, 915 may reside in the same die package.

Figure 10:
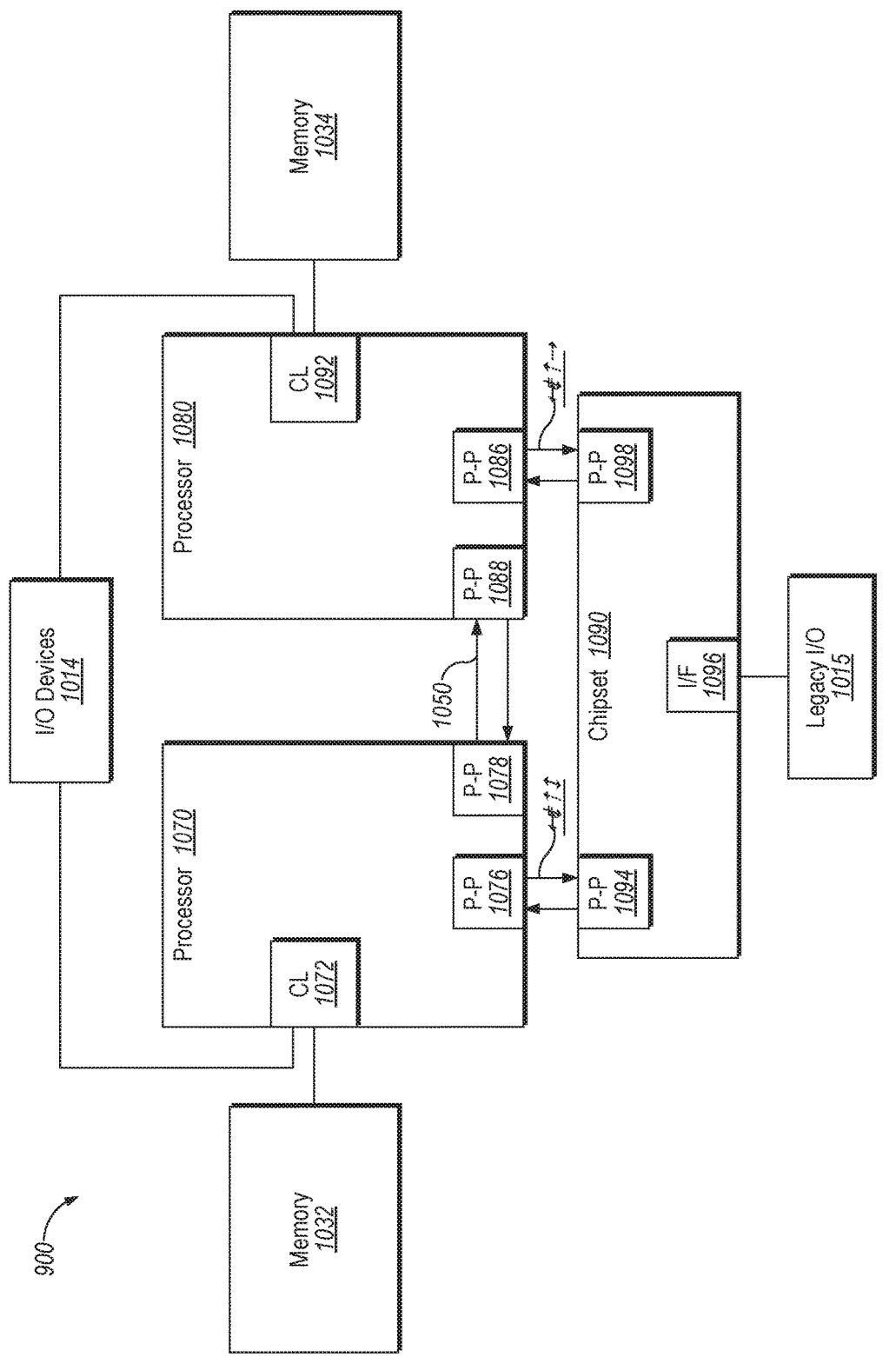
FIG. 10 is a block diagram illustrating a system in which an implementation of the disclosure may operate.

Referring now to FIG. 10, shown is a block diagram of a system 1000 in which an embodiment of the disclosure may operate. FIG. 10 illustrates processors 1070, 1080. In one embodiment, processors 1070, 1080 may support binary translation alias detection as described above. Processors 1070, 1080 may include integrated memory and I/O control logic ("CL") 1072 and 1082, respectively and intercommunicate with each other via point-to-point interconnect 1050 between point-to-point (P-P) interfaces 1078 and 1088 respectively. Processors 1070, 1080 each communicate with chipset 1090 via point-to-point interconnects 1052 and 1054 through the respective P-P interfaces 1076 to 1094 and 1086 to 1098 as shown. For at least one embodiment, the CL 1072, 1082 may include integrated memory controller units. CLs 1072, 1082 may include I/O control logic. As depicted, memories 1032, 1034 coupled to CLs 1072, 1082 and I/O devices 1014 are also coupled to the control logic 1072, 1082. Legacy I/O devices 1015 are coupled to the chipset 1090 via interface 1096.

Figure 11:
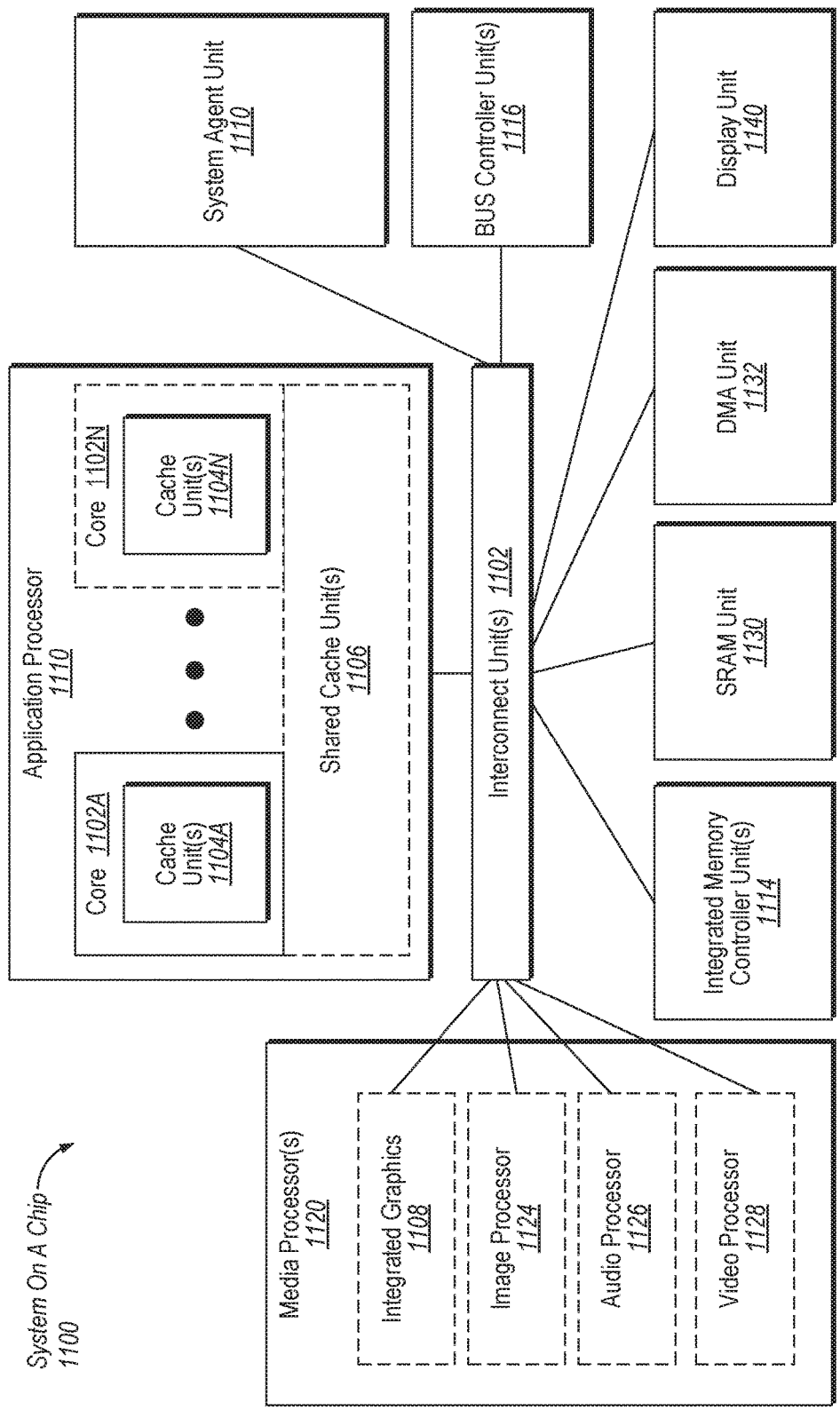
FIG. 11 is a block diagram illustrating a System-on-a-Chip (SoC) according to an implementation of the disclosure.

Embodiments may be implemented in many different system types. FIG. 11 is a block diagram of a SoC 1100 in accordance with an embodiment of the disclosure. Dashed lined boxes are optional features on more advanced SoCs. In FIG. 11, an interconnect unit(s) 1112 is coupled to: an application processor 1120 which includes a set of one or more cores 1102A-N and shared cache unit(s) 1106; a system agent unit 1110; a bus controller unit(s) 1116; an integrated memory controller unit(s) 1114; a set or one or more media processors 1118 which may include integrated graphics logic 1108, an image processor 1124 for providing still and/or video camera functionality, an audio processor 1126 for providing hardware audio acceleration, and a video processor 1128 for providing video encode/decode acceleration; an static random access memory (SRAM) unit 1130; a direct memory access (DMA) unit 1132; and a display unit 1140 for coupling to one or more external displays. In one embodiment, a memory module may be included in the integrated memory controller unit(s) 1114. In another embodiment, the memory module may be included in one or more other components of the SoC 1100 that may be used to access and/or control a memory. The application processor 1120 may include a PMU for implementing silent memory instructions and miss-rate tracking to optimize switching policy on threads as described in embodiments herein.

The memory hierarchy includes one or more levels of cache within the cores, a set or one or more shared cache units 1106, and external memory (not shown) coupled to the set of integrated memory controller units 1114. The set of shared cache units 1106 may include one or more mid-level caches, such as level 2 (L2), level 3 (L3), level 4 (L4), or other levels of cache, a last level cache (LLC), and/or combinations thereof.

In some embodiments, one or more of the cores 1102A-N are capable of multi-threading. The system agent 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture and/or instruction set. For example, some of the cores 1102A-N may be in order while others are out-of-order. As another example, two or more of the cores 1102A-N may be capable of execution the same instruction set, while others may be capable of executing only a subset of that instruction set or a different instruction set.

The application processor 1120 may be a general-purpose processor, such as a Core™ i3, i5, i7, 2 Duo and Quad, Xeon™, Itanium™, Atom™ or Quark™ processor, which are available from Intel™ Corporation, of Santa Clara, Calif. Alternatively, the application processor 1120 may be from another company, such as ARM Holdings™, Ltd, MIPS™, etc. The application processor 1120 may be a special-purpose processor, such as, for example, a network or communication processor, compression engine, graphics processor, co-processor, embedded processor, or the like. The application processor 1120 may be implemented on one or more chips. The application processor 1120 may be a part of and/or may be implemented on one or more substrates using any of a number of process technologies, such as, for example, BiCMOS, CMOS, or NMOS.

Figure 12:
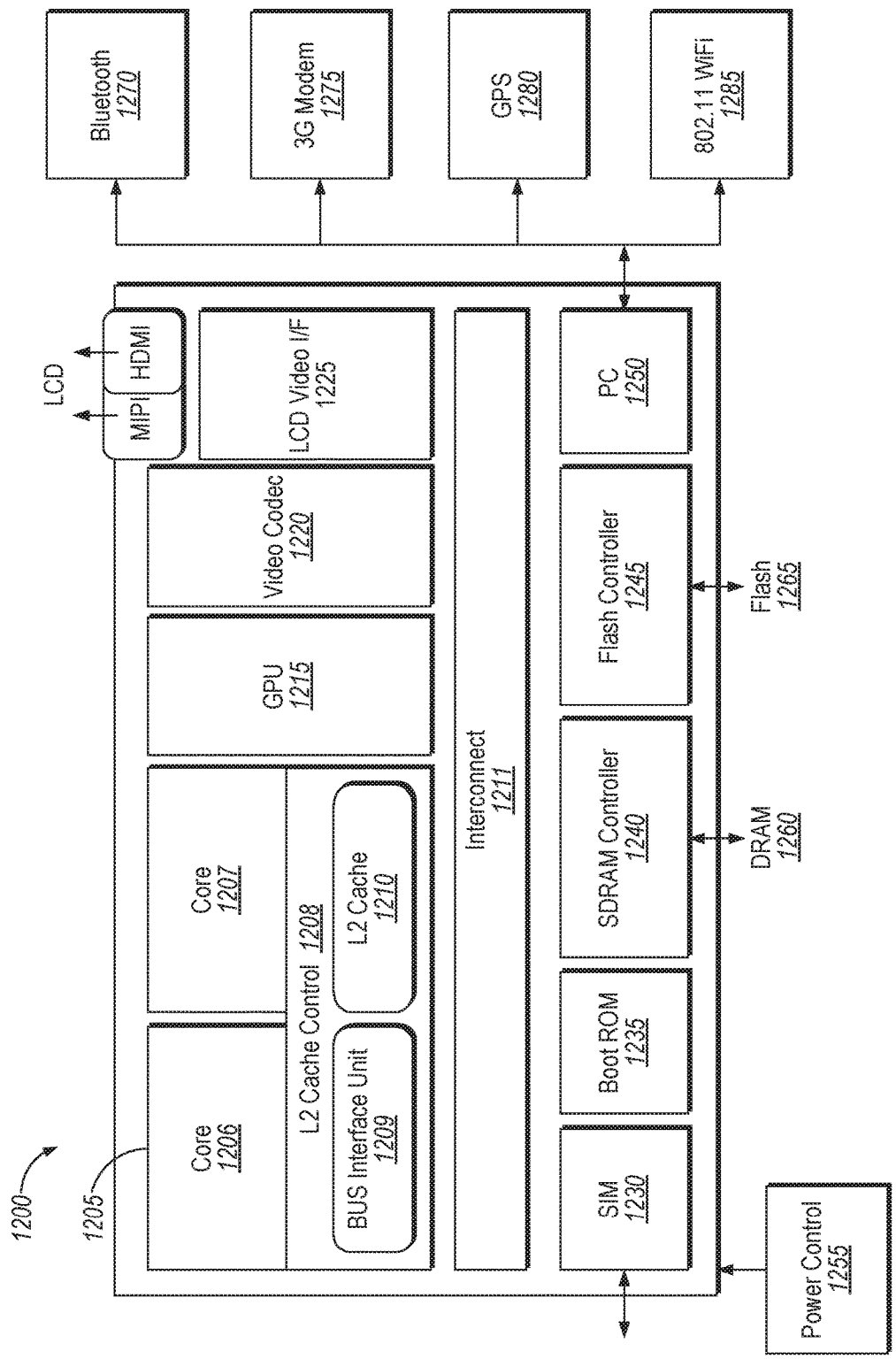
FIG. 12 is a block diagram illustrating a SoC design according to an implementation of the disclosure.

FIG. 12 is a block diagram of an embodiment of a system on-chip (SoC) design in accordance with the disclosure. As a specific illustrative example, SoC 1200 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1200 includes 2 cores—1206 and 1207. Cores 1206 and 1207 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1206 and 1207 are coupled to cache control 1208 that is associated with bus interface unit 1209 and L2 cache 1210 to communicate with other parts of system 1200. Interconnect 1210 includes an on-chip interconnect, such as an IOSF, AMBA, or other interconnect discussed above, which potentially implements one or more aspects of the described disclosure. In one embodiment, cores 1206, 1207 may support binary translation alias detection in an out-of-order processor as described in embodiments herein.

Interconnect 1210 provides communication channels to the other components, such as a Subscriber Identity Module (SIM) 1230 to interface with a SIM card, a boot ROM 1235 to hold boot code for execution by cores 1206 and 1207 to initialize and boot SoC 1200, a SDRAM controller 1240 to interface with external memory (e.g. DRAM 1260), a flash controller 1245 to interface with non-volatile memory (e.g.

Flash 1265), a peripheral control 1250 (e.g. Serial Peripheral Interface) to interface with peripherals, video codecs 1220 and Video interface 1225 to display and receive input (e.g. touch enabled input), GPU 1215 to perform graphics related computations, etc. Any of these interfaces may incorporate aspects of the disclosure described herein. In addition, the system 1200 illustrates peripherals for communication, such as a Bluetooth module 1270, 3G modem 1275, GPS 1280, and Wi-Fi 1185.

Figure 13:
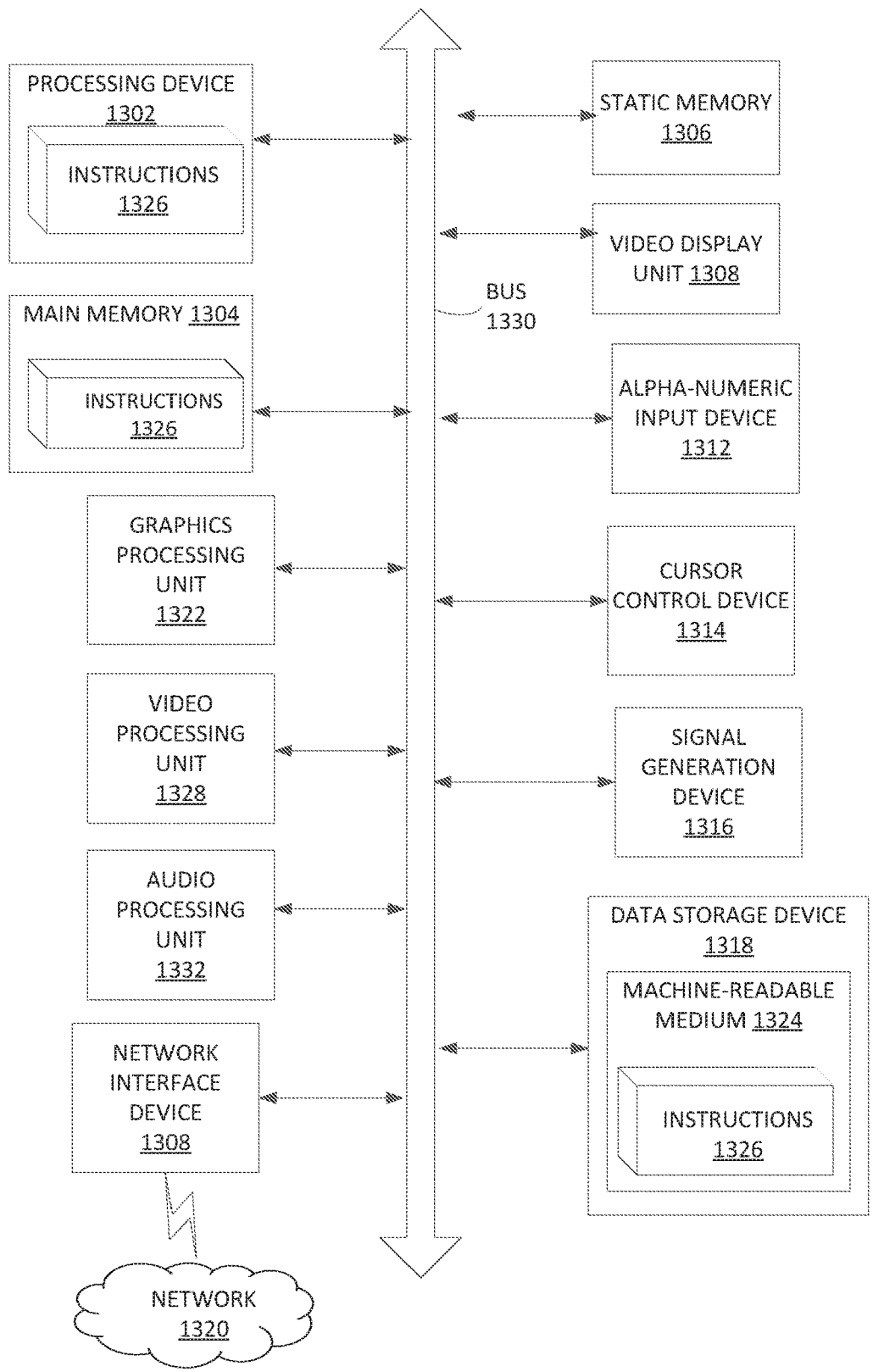
FIG. 13 illustrates a block diagram illustrating a computer system according to an implementation of the disclosure.

FIG. 13 illustrates a diagrammatic representation of a machine in the example form of a computer system 1200 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1300 includes a processing device 1302, a main memory 1304 (e.g., read-only memory (ROM), flash memory, dynamic random access memory (DRAM) (such as synchronous DRAM (SDRAM) or DRAM (RDRAM), etc.), a static memory 1306 (e.g., flash memory, static random access memory (SRAM), etc.), and a data storage device 1318, which communicate with each other via a bus 1330.

Processing device 1302 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1302 may also be one or more special-purpose processing devices such as an application specific integrated circuit (ASIC), a field programmable gate array (FPGA), a digital signal processor (DSP), network processor, or the like. In one embodiment, processing device 1302 may include one or processing cores. The processing device 1302 is configured to execute the processing logic 1326 for performing the operations and steps discussed herein. In one embodiment, processing device 1302 is the same as processor architecture 100 described with respect to FIG. 1 that implement techniques for supporting binary translation alias detection in an out-of-order processor as described herein with embodiments of the disclosure.

The computer system 1300 may further include a network interface device 1308 communicably coupled to a network 1320. The computer system 1300 also may include a video display unit 1310 (e.g., a liquid crystal display (LCD) or a cathode ray tube (CRT)), an alphanumeric input device 1312 (e.g., a keyboard), a cursor control device 1314 (e.g., a mouse), and a signal generation device 1316 (e.g., a speaker). Furthermore, computer system 1300 may include a graphics processing unit 1322, a video processing unit 1328, and an audio processing unit 1332.

The data storage device 1318 may include a machine-accessible storage medium 1324 on which is stored software 1326 implementing any one or more of the methodologies of functions described herein, such as implementing silent memory instructions and miss-rate tracking to optimize switching policy on threads in a processing device as described above. The software 1326 may also reside, completely or at least partially, within the main memory 1304 as instructions 1326 and/or within the processing device 1302 as processing logic 1326 during execution thereof by the computer system 1300; the main memory 1304 and the processing device 1302 also constituting machine-accessible storage media. In some implementations, data storage device 1318 may include a non-transitory computer-readable storage medium, such as computer-readable storage medium 1324, on which may store instructions 1326 encoding any one or more of the methods or functions described herein, including instructions encoding the techniques including the alias detection logic 154 of FIG. 1 for implementing method 400 of FIG. 4 or method 500 of FIG. 5 for supporting binary translation alias detection in an out-of-order processor.

The machine-readable storage medium 1324 may also be used to store instructions 1326 implementing silent memory instructions and miss-rate tracking to optimize switching policy on threads in a processing device such as described with respect to processing device 100 in FIG. 1, and/or a software library containing methods that call the above applications. While the machine-accessible storage medium 1328 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

The following examples pertain to further embodiments.

Example 1 includes a processing device comprising: 1) a memory to store a plurality of instructions; 2) a processor core, operatively coupled to the memory, to execute the instructions, the processor core to: a) receive a sequence of instructions reordered by a binary translator for execution by the processor core; b) identify a first load instruction of the sequence of instructions, the first load instruction references a memory location that stores a data item to be loaded; c) detect an occurrence of a second load instruction of the sequence of instructions, the second load instruction to access the memory location subsequent to an execution of the first load instruction; d) enable a protection field in the first load instruction based on the detected occurrence of the second load instruction, the enabled protection field indicates that the first load instruction is to be checked for an aliasing associated with the memory location with respect to an execution of a subsequent store instruction; and e) eliminate the second load instruction based on the enabled of the protection field in the first load instruction.

Example 2 includes the processing device of example 1, wherein to check for the aliasing associated with the memory location, the processor core is further to determine whether the store instruction is to execute an intermediate store operation between an execution of the first load instruction and the second load instruction.

Example 3 includes the processing device of example 1, wherein the processor core is further to, responsive to enabling the protection field in the first load instruction, determine an alias set identifier for the first load instruction, the alias set identifier to identify a grouping of speculated memory accesses associated with the memory location.

Example 4 includes the processing device of example 3, wherein the processor core is further to: 1) identify a store instruction to be executed subsequent to the first load instruction; and 2) enable a C-bit field of the store instruction based on the enabling of the protection field in the first load instruction.

Example 5 includes the processing device of example 4, wherein the processor core is further to incorporate the alias set identifier of the first load instruction into the store instruction based on the enabled C-bit field.

Example 6 includes the processing device of example 5, wherein responsive to detecting the enabled C-bit field of the store instruction, the processor core is further to: 1) identify a plurality of load instructions having an enabled protection field, the plurality of load instructions being in the grouping of speculated memory accesses identified by the alias set identifier; and 2) check the plurality of load instructions for the aliasing of the memory location.

Example 7 includes the processing device of example 6, wherein responsive to detecting the enabled C-bit field of the store instruction, the processor core is further to disable the protection filed in each of the plurality of load instructions based on the check.

Example 8 includes a method comprising: 1) receiving, by a processing device, a sequence of instructions reordered by a binary translator for execution by the processor core; 2) identifying a first load instruction of the sequence of instructions, the first load instruction references a memory location that stores a data item to be loaded; 3) detecting an occurrence of a second load instruction of the sequence of instructions, the second load instruction to access the memory location subsequent to an execution of the first load instruction; 4) enabling, by the processing device, a protection field in the first load instruction based on the detected occurrence of the second load instruction, the enabled protection field indicates that the first load instruction is to be checked for an aliasing associated with the memory location with respect to an execution of a subsequent store instruction; and 5) eliminate, by the processing device, the second load instruction based on the enabled of the protection field in the first load instruction.

Example 9 includes the method of example 8, wherein to check for the aliasing associated with the memory location, further comprises determining whether the store instruction is to execute an intermediate store operation between an execution of the first load instruction and the second load instruction.

Example 10 includes the method of example 8, further comprising, responsive to enabling the protection field in the first load instruction, determining an alias set identifier for the first load instruction, the alias set identifier to identify a grouping of speculated memory accesses associated with the memory location.

Example 11 includes the method of example 10, further comprising: 1) identifying a store instruction to be executed subsequent to the first load instruction; and 2) enabling a C-bit field of the store instruction based on the enabling of the protection field in the first load instruction.

Example 12 includes the method of example 11, further comprising incorporating the alias set identifier of the first load instruction into the store instruction based on the enabled C-bit field.

Example 13 includes the method of example 12, further comprising responsive to detecting the enabled cleared field of the store instruction: 1) identifying a plurality of load instructions having an enabled protection field, the plurality of load instructions being in the grouping of speculated memory accesses identified by the alias set identifier; and 2) checking the plurality of load instructions for the aliasing of the memory location.

Example 14 includes the method of example 13, further comprising, responsive to detecting the enabled C-bit field of the store instruction, disabling the protection filed in each of the plurality of load instructions based on the check.

Example 15 includes a system on chip (SoC) comprising: 1) a memory controller unit (MCU); and 2) a processor, operatively coupled to the MCU, to: a) receive a sequence of instructions reordered by a binary translator for execution by the processor core; b) identify a first load instruction of the sequence of instructions, the first load instruction references a memory location that stores a data item to be loaded; c) detect an occurrence of a second load instruction of the sequence of instructions, the second load instruction to access the memory location subsequent to an execution of the first load instruction; d) enable a protection field in the first load instruction based on the detected occurrence of the second load instruction, the enabled protection field indicates that the first load instruction is to be checked for an aliasing associated with the memory location with respect to an execution of a subsequent store instruction; and e) eliminate the second load instruction based on the enabled of the protection field in the first load instruction.

Example 16 includes the SoC of example 15, wherein to check for the aliasing associated with the memory location, the processor is further to determine whether the store instruction is to execute an intermediate store operation between an execution of the first load instruction and the second load instruction.

Example 17 includes the SoC of example 15, wherein the processor core is further to, responsive to enabling the protection field in the first load instruction, determine an alias set identifier for the first load instruction, the alias set identifier to identify a grouping of speculated memory accesses associated with the memory location.

Example 18 includes the SoC of example 17, wherein the processor is further to: 1) identify a store instruction to be executed subsequent to the first load instruction; and 2) enable a C-bit field of the store instruction based on the enabling of the protection field in the first load instruction.

Example 19 includes the SoC of example 18, wherein the processor is further to incorporate the alias set identifier of the first load instruction into the store instruction based on the enabled C-bit field.

Example 20 includes the SoC of example 19, wherein responsive to detecting the enabled C-bit field of the store instruction, the processor is further to: 1) identify a plurality of load instructions having an enabled protection field, the plurality of load instructions being in the grouping of speculated memory accesses identified by the alias set identifier; and 2) check the plurality of load instructions for the aliasing of the memory location.

Example 21 includes the SoC of example 20, wherein responsive to detecting the enabled C-bit field of the store instruction, the processor is further to disable the protection filed in each of the plurality of load instructions based on the check.

Example 22 includes a non-transitory machine-readable storage medium including instructions that, when executed by a processing device, cause the processing device to: 1) receive, by the processing device, a sequence of instructions reordered by a binary translator for execution by the processor core; 2) identify a first load instruction of the sequence of instructions, the first load instruction references a memory location that stores a data item to be loaded; 3) detect an occurrence of a second load instruction of the sequence of instructions, the second load instruction to access the memory location subsequent to an execution of the first load instruction; 4) enable a protection field in the first load instruction based on the detected occurrence of the second load instruction, the enabled protection field indicates that the first load instruction is to be checked for an aliasing associated with the memory location with respect to an execution of a subsequent store instruction; and 5) eliminate the second load instruction based on the enabled of the protection field in the first load instruction.

Example 23 includes the non-transitory machine-readable storage medium of example 22, wherein to check for the aliasing associated with the memory location, the processor core is further to determine whether the store instruction is to execute an intermediate store operation between an execution of the first load instruction and the second load instruction.

Example 24 includes the non-transitory machine-readable storage medium of example 22, wherein the processing device is further to, responsive to enabling the protection field in the first load instruction, determine an alias set identifier for the first load instruction, the alias set identifier to identify a grouping of speculated memory accesses associated with the memory location.

Example 25 includes the non-transitory machine-readable storage medium of example 24, wherein the processing device is further to: 1) identify a store instruction to be executed subsequent to the first load instruction; and 2) enable a C-bit field of the store instruction based on the enabling of the protection field in the first load instruction.

Example 26 includes the non-transitory machine-readable storage medium of example 25, wherein the processing device is further to incorporate the alias set identifier of the first load instruction into the store instruction based on the enabled C-bit field.

Example 27 includes the non-transitory machine-readable storage medium of example 26, wherein responsive to detecting the enabled C-bit field of the store instruction, the processing device is further to: 1) identify a plurality of load instructions having an enabled protection field, the plurality of load instructions being in the grouping of speculated memory accesses identified by the alias set identifier; and 2) check the plurality of load instructions for the aliasing of the memory location.

Example 28 includes the non-transitory machine-readable storage medium of example 27, wherein responsive to detecting the enabled C-bit field of the store instruction, the processor core is further to disable the protection filed in each of the plurality of load instructions based on the check.

Example 29 includes a non-transitory, computer-readable storage medium including instructions that, when executed by a processor, cause the processor to perform the method of examples 8-14.

Example 30 includes an apparatus comprising: 1) a plurality of functional units of a processor; 2) means for receiving a sequence of instructions reordered by a binary translator for execution by the processor core; 3) means for identifying a first load instruction of the sequence of instructions, the first load instruction references a memory location that stores a data item to be loaded; 4) means for detecting an occurrence of a second load instruction of the sequence of instructions, the second load instruction to access the memory location subsequent to an execution of the first load instruction; 5) means for enabling a protection field in the first load instruction based on the detected occurrence of the second load instruction, the enabled protection field indicates that the first load instruction is to be checked for an aliasing associated with the memory location with respect to an execution of a subsequent store instruction; and 6) means for eliminating the second load instruction based on the enabled of the protection field in the first load instruction.

Example 31 includes the apparatus of example 30, further comprising the subject matter of any of examples 1-7 and 15-21.

Example 32 includes a system comprising: a memory device and a processor comprising a memory controller unit, wherein the processor is configured to perform the method of any of examples 8-14.

Example 33 includes the system of example 32, further comprising the subject matter of any of examples 1-7 and 15-21.

Example 34 includes a processing device comprising: 1) a memory to store a plurality of instructions; 2) a processor core, operatively coupled to the memory, to execute the instructions, the processor core to: a) detect a load instruction associated with a memory location, the load instruction is at least one of a sequence of instructions reordered by a binary translator for execution by the processor device; b) detect a store instruction of the sequence of instructions, the store instruction to access the memory location subsequent to an execution of the load instruction; c) responsive to detecting the store instruction, determine whether a protection field of the load instruction is enabled; d) responsive to detecting the protection field is enabled, check the load instruction for aliasing information associated with the memory location with respect to an execution of the store instruction; and e) determine whether to execute the store instruction based on the aliasing information.

Example 35 include the processing device of example 34, wherein the processing device is further to, responsive to detecting the aliasing information associated with the memory location, generate a fault condition.

Example 36 includes the processing device of example 34, wherein the processing device is further to identify an alias set identifier in the store instruction, the alias set identifier identifying a grouping of speculated memory accesses associated with the memory location Example 37 includes the processing device of example 36, wherein the processing device is further to determine whether the load instruction is in the grouping of speculated memory accesses based on the alias set identifier.

Example 38 include the processing device of example 37, wherein the processing device is further to, responsive to determining that the load instruction is in the grouping of speculated memory accesses, determine whether a C-bit field of the store instruction is enabled.

Example 39 includes the processing device of example 38, wherein the processing device is further to, responsive to detecting that C-bit field of the store instruction is enabled, disable the protection field of the load instruction subsequent to an execution of the store instruction.

Example 40 includes a method, comprising: 1) detecting, by a processing device, a load instruction associated with a memory location, the load instruction is at least one of a sequence of instructions reordered by a binary translator for execution by the processor device; 2) detecting, by a processing device, a store instruction of the sequence of instructions, the store instruction to access the memory location subsequent to an execution of the load instruction; 3) responsive to detecting the store instruction, determining whether a protection field of the load instruction is enabled; 4) responsive to detecting the protection field is enabled, checking, by the processing device, the load instruction for aliasing information associated with the memory location with respect to an execution of the store instruction; and 5) determining, by the processing device, whether to execute the store instruction based on the aliasing information.

Example 41 include the method of example 40, further comprising responsive to detecting the aliasing information associated with the memory location, generating a fault condition.

Example 42 includes the method of example 40, further comprising identifying an alias set identifier in the store instruction, the alias set identifier identifying a grouping of speculated memory accesses associated with the memory location Example 43 includes the method of example 42, further comprising determining whether the load instruction is in the grouping of speculated memory accesses based on the alias set identifier.

Example 44 includes the method of example 43, further comprising responsive to determining that the load instruction is in the grouping of speculated memory accesses, determining whether a C-bit field of the store instruction is enabled.

Example 45 includes the method of example 44, further comprising responsive to detecting that C-bit field of the store instruction is enabled, disabling the protection field of the load instruction subsequent to an execution of the store instruction.

Example 46 includes a system on chip (SoC) comprising: 1) a memory controller unit (MCU); and 2) a processor, operatively coupled to the MCU, to: a) detect a load instruction associated with a memory location, the load instruction is at least one of a sequence of instructions reordered by a binary translator for execution by the processor device; b) detect a store instruction of the sequence of instructions, the store instruction to access the memory location subsequent to an execution of the load instruction; c) responsive to detecting the store instruction, determine whether a protection field of the load instruction is enabled; d) responsive to detecting the protection field is enabled, check the load instruction for aliasing information associated with the memory location with respect to an execution of the store instruction; and e) determine whether to execute the store instruction based on the aliasing information.

Example 47 include the SoC of example 46, wherein the processor is further to, responsive to detecting the aliasing information associated with the memory location, generate a fault condition.

Example 48 includes the SoC of example 46, wherein the processor is further to identify an alias set identifier in the store instruction, the alias set identifier identifying a grouping of speculated memory accesses associated with the memory location.

Example 49 includes the SoC of example 48, wherein the processor is further to determine whether the load instruction is in the grouping of speculated memory accesses based on the alias set identifier.

Example 50 include the SoC of example 49, wherein the processor is further to, responsive to determining that the load instruction is in the grouping of speculated memory accesses, determine whether a C-bit field of the store instruction is enabled.

Example 51 includes the SoC of example 50, wherein the processor is further to, responsive to detecting that C-bit field of the store instruction is enabled, disable the protection field of the load instruction subsequent to an execution of the store instruction.

Example 52 includes a non-transitory machine-readable storage medium including instructions that, when executed by a processing device, cause the processing device to: 1) detect, by the processing device, a load instruction associated with a memory location, the load instruction is at least one of a sequence of instructions reordered by a binary translator for execution by the processor device; 2) detect a store instruction of the sequence of instructions, the store instruction to access the memory location subsequent to an execution of the load instruction; 3) responsive to detecting the store instruction, determine whether a protection field of the load instruction is enabled; 4) responsive to detecting the protection field is enabled, check the load instruction for aliasing information associated with the memory location with respect to an execution of the store instruction; and 5) determine whether to execute the store instruction based on the aliasing information.

Example 53 includes the non-transitory machine-readable storage medium of example 52, wherein the processing device is further to, responsive to detecting the aliasing information associated with the memory location, generate a fault condition.

Example 54 includes the non-transitory machine-readable storage medium of example 52, wherein the processing device is further to identify an alias set identifier in the store instruction, the alias set identifier identifying a grouping of speculated memory accesses associated with the memory location.

Example 55 includes the non-transitory machine-readable storage medium of example 54, wherein the processing device is further to determine whether the load instruction is in the grouping of speculated memory accesses based on the alias set identifier.

Example 56 includes the non-transitory machine-readable storage medium of example 55, wherein the processing device is further to, responsive to determining that the load instruction is in the grouping of speculated memory accesses, determine whether a C-bit field of the store instruction is enabled.

Example 57 includes the non-transitory machine-readable storage medium of example 56, wherein the processing device is further to, responsive to detecting that C-bit field of the store instruction is enabled, disable the protection field of the load instruction subsequent to an execution of the store instruction.

Example 58 includes a non-transitory, computer-readable storage medium including instructions that, when executed by a processor, cause the processor to perform the method of examples 40-45.

Example 59 includes an apparatus comprising: 1) a plurality of functional units of a processor; 2) means for detecting a load instruction associated with a memory location, the load instruction is at least one of a sequence of instructions reordered by a binary translator for execution by the processor device; 3) means for detecting a store instruction of the sequence of instructions, the store instruction to access the memory location subsequent to an execution of the load instruction; 4) means for, responsive to detecting the store instruction, determining whether a protection field of the load instruction is enabled; 5) means for, responsive to detecting the protection field is enabled, checking the load instruction for aliasing information associated with the memory location with respect to an execution of the store instruction; and 6) means for determining whether to execute the store instruction based on the aliasing information.

Example 60 includes the apparatus of example 30, further comprising the subject matter of any of examples 34-39 and 46-51.

Example 61 includes a system comprising: a memory device and a processor comprising a memory controller unit, wherein the processor is configured to perform the method of any of examples 40-45.

Example 62 includes the system of example 61, further comprising the subject matter of any of examples 34-39 and 46-51.

While the disclosure has been described with respect to a limited number of embodiments, those skilled in the art will appreciate numerous modifications and variations there from. It is intended that the appended claims cover all such modifications and variations as fall within the true spirit and scope of this disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 910 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A processing device comprising:
    a memory to store a plurality of instructions;
    a processor core, operatively coupled to the memory, to execute the instructions, the processor core to:
        receive a sequence of instructions reordered by a binary translator for execution by the processor core;
        identify a first load instruction of the sequence of instructions, the first load instruction to reference a memory location that stores a data item to be loaded;
        detect an occurrence of a second load instruction of the sequence of instructions, the second load instruction to access the memory location subsequent to an execution of the first load instruction;
        enable a protection field in the first load instruction based on the detected occurrence of the second load instruction, the enabled protection field to indicate that the first load instruction is to be checked for an aliasing associated with the memory location with respect to an execution of a subsequent store instruction; and
        eliminate the second load instruction from the sequence of instructions that are reordered based on the protection field in the first load instruction.

2. The processing device of claim 1, wherein to check for the aliasing associated with the memory location, the processor core is further to determine whether the store instruction is to execute an intermediate store operation between an execution of the first load instruction and the second load instruction.

3. The processing device of claim 1, wherein the processor core is further to, responsive to enabling the protection field in the first load instruction, determine an alias set identifier for the first load instruction, the alias set identifier to identify a grouping of speculated memory accesses associated with the memory location.

4. The processing device of claim 3, wherein the processor core is further to:
    identify a store instruction to be executed subsequent to the first load instruction; and
    enable a C-bit field of the store instruction based on the enabling of the protection field in the first load instruction.

5. The processing device of claim 4, wherein the processor core is further to incorporate the alias set identifier of the first load instruction into the store instruction based on the enabled C-bit field.

6. The processing device of claim 5, wherein the processor core is further to, responsive to detecting the enabled C-bit field of the store instruction:
    identify a plurality of load instructions having an enabled protection field, the plurality of load instructions being in the grouping of speculated memory accesses identified by the alias set identifier; and
    check the plurality of load instructions for the aliasing of the memory location.

7. The processing device of claim 6, wherein responsive to detecting the enabled C-bit field of the store instruction, the processor core is further to disable the protection filed in each of the plurality of load instructions based on the check.

8. A method, comprising:
    detecting, by a processing device, a load instruction associated with a memory location, the load instruction is at least one of a sequence of instructions reordered by a binary translator for execution by the processing device;
    detecting, by the processing device, a store instruction of the sequence of instructions, the store instruction to access the memory location subsequent to an execution of the load instruction;

responsive to detecting the store instruction, determining whether a protection field of the load instruction is enabled;

responsive to detecting the protection field is enabled, checking, by the processing device, the load instruction for aliasing information associated with the memory location with respect to an execution of the store instruction; and determining, by the processing device, whether to eliminate the store instruction from the sequence of instructions that are reordered based on the aliasing information.

9. The method of claim 8, further comprising responsive to detecting the aliasing information associated with the memory location, generating a fault condition.

10. The method of claim 8, further comprising identifying an alias set identifier in the store instruction, the alias set identifier identifying a grouping of speculated memory accesses associated with the memory location.

11. The method of claim 10, further comprising determining whether the load instruction is in the grouping of speculated memory accesses based on the alias set identifier.

12. The method of claim 11, further comprising responsive to determining that the load instruction is in the grouping of speculated memory accesses, determining whether a C-bit field of the store instruction is enabled.

13. The method of claim 12, further comprising responsive to detecting that C-bit field of the store instruction is enabled, disabling the protection field of the load instruction subsequent to an execution of the store instruction.

14. A non-transitory computer-readable medium comprising instructions that, when executed by a processing device, cause the processing device to:

receive, by the processing device, a sequence of instructions reordered by a binary translator for execution by the processing device;

identify a first load instruction of the sequence of instructions, the first load instruction to reference a memory location that stores a data item to be loaded;

detect an occurrence of a second load instruction of the sequence of instructions, the second load instruction to access the memory location subsequent to an execution of the first load instruction;

enable a protection field in the first load instruction based on the detected occurrence of the second load instruction, the enabled protection field to indicate that the first load instruction is to be checked for an aliasing associated with the memory location with respect to an execution of a subsequent store instruction; and eliminate the second load instruction from the sequence of instructions that are reordered based on the protection field in the first load instruction.

15. The non-transitory computer-readable medium of claim of claim 14, wherein to enable the protection field, the binary translator is further to set a bit of the protection field to a value.

16. The non-transitory computer-readable medium of claim of claim 14, wherein the processing device is further to, responsive to enabling a P-bit field in the first load instruction, determine an alias set identifier for the first load instruction, the alias set identifier to identify a grouping of speculated memory accesses associated with the memory location.

17. The non-transitory computer-readable medium of claim of claim 16, wherein the processing device is further to:

identify a store instruction to be executed subsequent to the first load instruction; and enable a C-bit field of the store instruction based on the enabling of the protection field in the first load instruction.

18. The non-transitory computer-readable medium of claim 17, wherein the processing device is further to incorporate the alias set identifier of the first load instruction into the store instruction based on the enabled C-bit field.

19. The non-transitory computer-readable medium of claim 18, wherein the processing device is further to, responsive to detecting the enabled C-bit field of the store instruction:

identify a plurality of load instructions having an enabled protection field, the plurality of load instructions being in the grouping of speculated memory accesses identified by the alias set identifier; and check the plurality of load instructions for the aliasing of the memory location.

20. The non-transitory computer-readable medium of claim 19, wherein the processing device is further to, responsive to detecting the enabled C-bit field of the store instruction, disable the protection filed in each of the plurality of load instructions based on the check.

* * * * *